(12) United States Patent
Kenney et al.

(10) Patent No.: US 10,355,331 B2
(45) Date of Patent: Jul. 16, 2019

(54) HEAT EXCHANGER WITH REGIONAL FLOW DISTRIBUTION FOR UNIFORM COOLING OF BATTERY CELLS

(71) Applicant: Dana Canada Corporation, Oakville (CA)

(72) Inventors: Benjamin A. Kenney, Toronto (CA); Meinrad K. A. Machler, Oakville (CA); Allan K. So, Mississauga (CA)

(73) Assignee: Dana Canada Corporation, Oakville, Ontario (CA)

( * ) Notice: Subject to any disclaimer, the term of this patent is extended or adjusted under 35 U.S.C. 154(b) by 482 days.

(21) Appl. No.: 15/172,677

(22) Filed: Jun. 3, 2016

(65) Prior Publication Data
US 2016/0359211 A1   Dec. 8, 2016

Related U.S. Application Data

(60) Provisional application No. 62/170,765, filed on Jun. 4, 2015.

(51) Int. Cl.
| | |
|---|---|
| *H01M 10/65* | (2014.01) |
| *H01M 10/6568* | (2014.01) |
| *F28F 3/12* | (2006.01) |
| *F28F 9/02* | (2006.01) |
| *F28F 13/06* | (2006.01) |

(Continued)

(52) U.S. Cl.
CPC ........... *H01M 10/6568* (2015.04); *F28F 3/12* (2013.01); *F28F 9/0265* (2013.01); *F28F 13/06* (2013.01); *H01M 10/613* (2015.04); *H01M 10/625* (2015.04); *H01M 10/647* (2015.04); *H01M 10/6557* (2015.04); *F28F 2210/10* (2013.01); *F28F 2250/102* (2013.01);

(Continued)

(58) Field of Classification Search
None
See application file for complete search history.

(56) References Cited

U.S. PATENT DOCUMENTS

| | | |
|---|---|---|
| 4,093,024 A | 6/1978 | Middleton |
| 4,098,331 A | 7/1978 | Ford et al. |

(Continued)

FOREIGN PATENT DOCUMENTS

| | | |
|---|---|---|
| JP | 2006220319 A | 8/2006 |
| WO | 2015113161 A1 | 8/2015 |

OTHER PUBLICATIONS

International Search Report and Written Opinion for Application No. PCT/CA2016/050633, dated Sep. 26, 2016, issued by the Canadian Intellectual Property Office.

*Primary Examiner* — Wyatt P McConnell
(74) *Attorney, Agent, or Firm* — Marshall & Melhorn, LLC

(57) ABSTRACT

A heat exchanger panel has a heat transfer surface with first and second heat transfer zones of different cooling capacities. Each zone has a subgroup of fluid flow passages having a flow capacity, each extending between a fluid inlet passage and a fluid outlet passage. Where one of the zones is adapted for cooling the tabs of a battery cell, the heat exchanger panel comprises at least one first header located at an end of the panel, including a fluid inlet header and/or a fluid outlet header, a second header at the opposite end of the panel, and a plurality of flow passages extending between the headers. At least one header has a height which is greater than the height of the flow passages, and is substantially the same as a spacing between tabs of adjacent batteries when separated by one of said heat exchanger panels.

23 Claims, 19 Drawing Sheets

(51) Int. Cl.

| | |
|---|---|
| *H01M 10/613* | (2014.01) |
| *H01M 10/625* | (2014.01) |
| *H01M 10/647* | (2014.01) |
| *H01M 10/6557* | (2014.01) |
| *H01M 10/052* | (2010.01) |

(52) U.S. Cl.
CPC ...... *H01M 10/052* (2013.01); *H01M 2220/20* (2013.01); *Y02E 60/122* (2013.01)

(56) References Cited

U.S. PATENT DOCUMENTS

| | | |
|---|---|---|
| 4,407,269 A | 10/1983 | Hopper |
| 6,503,653 B2 | 1/2003 | Rock |
| 6,780,536 B2 | 8/2004 | Debe et al. |
| 7,851,080 B2 | 12/2010 | Weber et al. |
| 8,679,667 B2 | 3/2014 | Phlegm et al. |
| 8,835,038 B2 | 9/2014 | Abels et al. |
| 8,835,039 B2 | 9/2014 | Teng et al. |
| 2004/0121205 A1 | 6/2004 | Blanchet |
| 2005/0064272 A1 | 3/2005 | Frank et al. |
| 2009/0258288 A1 | 10/2009 | Weber et al. |
| 2011/0052959 A1 | 3/2011 | Koetting et al. |
| 2012/0021270 A1 | 1/2012 | Kumar et al. |
| 2012/0028097 A1 | 2/2012 | Oury |
| 2012/0028098 A1 | 2/2012 | Meehan et al. |
| 2012/0040222 A1 | 2/2012 | Quick et al. |
| 2012/0040223 A1 | 2/2012 | Odumodu |
| 2012/0115010 A1 | 5/2012 | Smith et al. |
| 2012/0315528 A1 | 12/2012 | Rajaie et al. |
| 2013/0171491 A1 | 7/2013 | Wei et al. |
| 2015/0044523 A1 | 2/2015 | Weber et al. |

HEAT EXCHANGER WITH REGIONAL FLOW DISTRIBUTION FOR UNIFORM COOLING OF BATTERY CELLS

CROSS-REFERENCE TO RELATED APPLICATION

This application claims priority to and the benefit of U.S. Provisional Patent Application No. 62/170,765 filed Jun. 4, 2015, the contents of which are incorporated herein by reference.

FIELD OF THE INVENTION

The invention relates to a heat exchanger for battery thermal management, the heat exchanger comprising a plurality of discrete heat exchanger panels, and particularly to such heat exchangers having structural features for enhancing uniformity of cooling across the surfaces of battery cells and for reducing pressure drop of the coolant flowing through the heat exchanger.

BACKGROUND

Rechargeable batteries such as batteries made up of many lithium-ion cells can be used in many applications, including for example in electric vehicle ("EV") and hybrid electric vehicle ("HEV") applications. During charging and discharging, such batteries can generate large amounts of heat that needs to be dissipated.

In advanced battery thermal management systems, individual battery cells are sandwiched between liquid-cooled heat exchanger panels having coolant circulation passages. The amount of heat removed from the cell is related to the flow rate of coolant through the plate. However, as the flow rate increases, the pressure drop also increases, thereby limiting the coolant flow rate and the cooling capacity of the panel.

In addition, most heat exchanger panels are designed to provide a uniform coolant distribution across the surfaces of the panel. However, the heat generated by a lithium-ion battery cell is not uniformly distributed across its surfaces. For example, hot spots may develop at the battery tabs and in the area near the battery tabs, particularly during fast charging of the battery cell, since the tabs of lithium-ion battery cells tend to develop more heat than the rest of the battery cell. In addition, hot spots may develop in the central area of the battery cell during discharge of the battery cell, under drive cycle conditions. Therefore, the cooling of such a battery with panels designed for uniform coolant distribution can result in uneven cooling of the battery cells, resulting in the creation of "hot spots" which can have adverse impacts on battery performance and battery life. Therefore, the removal of excess heat, whether from the area near the battery tabs or other areas of the battery cell, would enhance battery performance and life.

There is a need for a improved constructions of heat exchangers for rechargeable batteries while improving manufacturability, which provide lower pressure drop and/or uniform cooling.

SUMMARY

In an aspect, there is provided a heat exchanger panel having a heat transfer surface, the surface having a first heat transfer zone and a second heat transfer zone. The heat exchanger panel comprises: (a) a first subgroup of fluid flow passages provided in the first heat transfer zone, wherein the first subgroup of fluid flow passages has a first flow capacity; (b) a second subgroup of fluid flow passages provided in the second heat transfer zone, wherein the second subgroup of fluid flow passages has a second flow capacity which is less than the first flow capacity; (c) at least one fluid inlet passage; (d) at least one fluid outlet passage; (e) a fluid inlet opening in flow communication with the at least one fluid inlet passage; and (f) a fluid outlet opening in flow communication with the at least one fluid outlet passage; wherein each of the fluid flow passages has a first end which is connected to, and in flow communication with, one of said at least one fluid inlet passages; and wherein each of the fluid flow passages has a second end which is connected to, and in flow communication with, one of said at least one fluid outlet passages.

In another aspect, there is provided a heat exchanger panel for cooling a battery cell having a plurality of tabs. The heat exchanger panel comprises: at least one first header located at a first end of the panel, said at least one first header including a fluid inlet header and/or a fluid outlet header; a second header located at a second end of the panel; a plurality of flow passages extending from the first end to the second end of the panel; wherein the at least one first header and/or the second header have a first height which is greater than a second height of the flow passages, and is substantially the same as a spacing between tabs of adjacent batteries when separated by one of said heat exchanger panels.

In another aspect, there is provided a heat exchanger comprising a plurality of heat exchanger panels as described herein. The heat exchanger panels are arranged in spaced, parallel relation to one another with the fluid inlet and outlet openings in flow communication with respective fluid inlet and outlet manifolds.

In another aspect, there is provided a heat exchanger comprising a plurality of repeating units. Each said repeating unit comprises a first battery cell, a second battery cell adjacent to the first battery cell, and a heat exchanger panel as described herein adjacent to the second battery cell, wherein a gap is provided between the tabs of the first battery cell and the tabs of the second battery cell in each said repeating unit, and wherein the gap is at least partially filled by an elongate filler strip.

In another aspect, there is provided a heat exchanger comprising a plurality of heat exchanger panels arranged in spaced, parallel relation to one another. Each said heat exchanger panel comprises: (a) a first heat transfer surface; (b) a plurality of fluid flow passages; (c) at least one fluid inlet passage; (d) at least one fluid outlet passage; (e) a fluid inlet opening in flow communication with the at least one fluid inlet passage; and (f) a fluid outlet opening in flow communication with the at least one fluid outlet passage; wherein the fluid inlet and outlet openings are in flow communication with respective fluid inlet and outlet manifolds; wherein each of the fluid flow passages has a first end which is connected to, and in flow communication with, one of said at least one fluid inlet passages; and wherein each of the fluid flow passages has a second end which is connected to, and in flow communication with, one of said at least one fluid outlet passages.

BRIEF DESCRIPTION OF THE DRAWINGS

The invention will now be described, by way of example only, with reference to the accompanying drawings in which.

DETAILED DESCRIPTION

Figure 1:
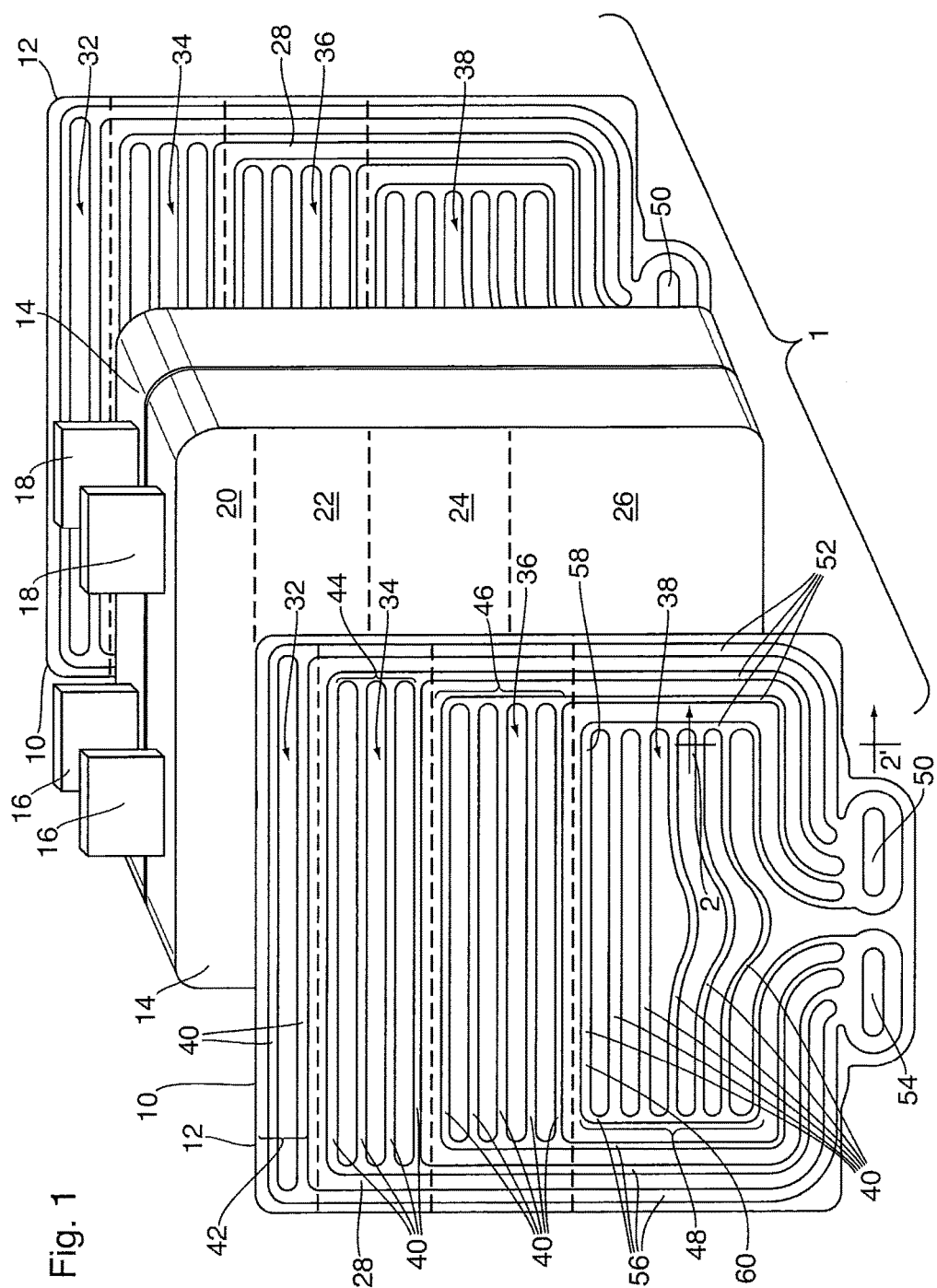
FIG. 1 is a perspective view showing a pair of battery cells and a pair of heat exchanger panels of a battery module according to an embodiment.

FIG. 1 illustrates a heat exchanger 10 according to a first embodiment. The heat exchanger 10 comprises a plurality of heat exchanger panels 12. Although only two panels 12 of heat exchanger 10 are shown in FIG. 1, it will be appreciated that the exchanger 10 may comprise additional panels 12.

The heat exchanger panels 12 are arranged in spaced, parallel relation to one another, wherein the spacing between adjacent heat exchanger panels 12 is sufficient to receive a pair of battery cells 14, wherein each battery cell 14 has one surface in close thermal contact with one of the heat transfer surfaces of an adjacent panel 12, and an opposite surface facing the other battery cell 14. FIG. 1 illustrates pair of battery cells 14 received between a pair of adjacent heat exchanger panels 12, however, it will be appreciated that the heat exchanger 10 may include additional battery cells 14 received between additional pairs of spaced apart panels 12. The combination of the battery cells 14 and the heat exchanger 10 is referred to herein as a battery module 1, in which the plurality of panels 12 comprising heat exchanger 10 are arranged in alternating order with pairs of battery cells 14 arranged as shown in FIG. 1 and in the partial cross-section of FIG. 2.

Figure 2:
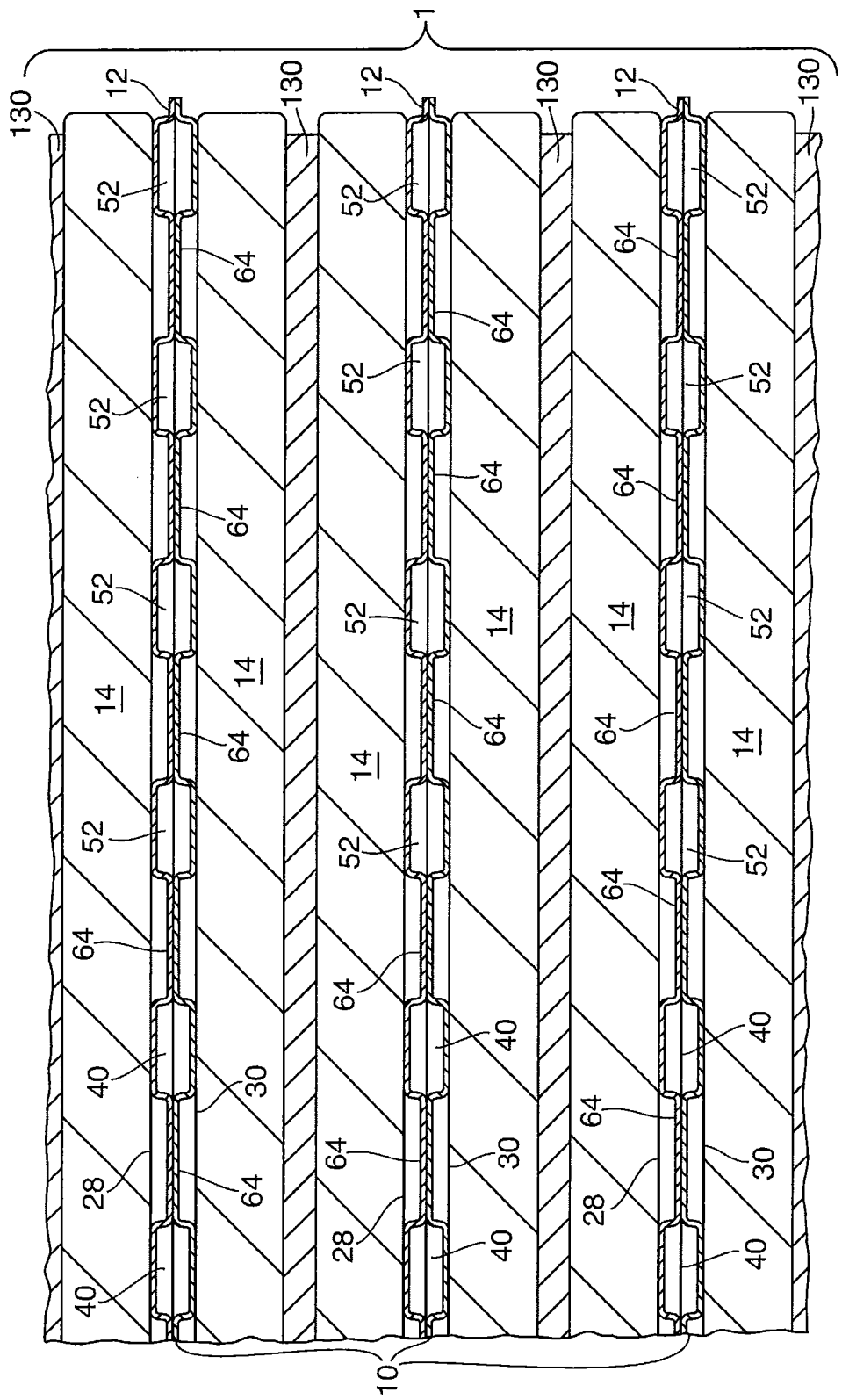
FIG. 2 is a cross section along line 2-2' of FIG. 1.
Figure 13:
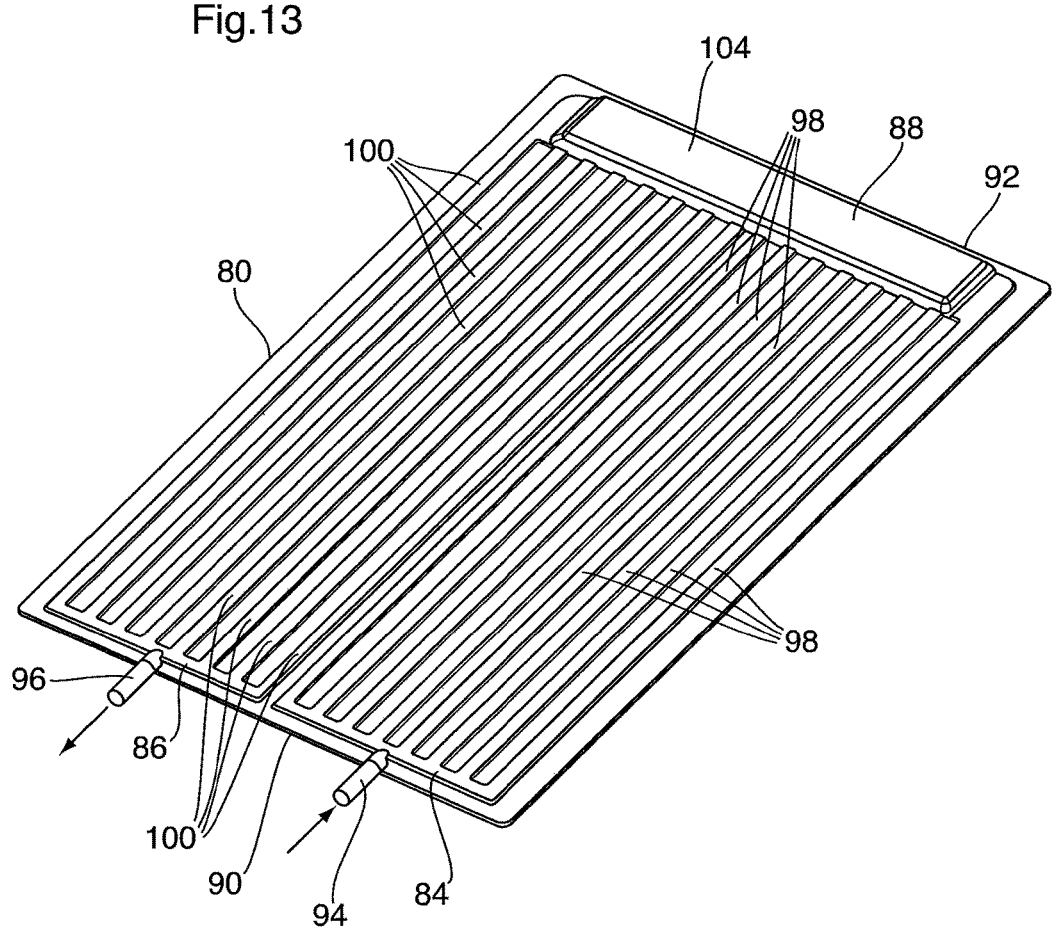
FIGS. 13 and 14 show a heat exchanger panel according to another embodiment, having a 1:1 configuration and having panels with enlarged headers for battery tab cooling.
Figure 14:
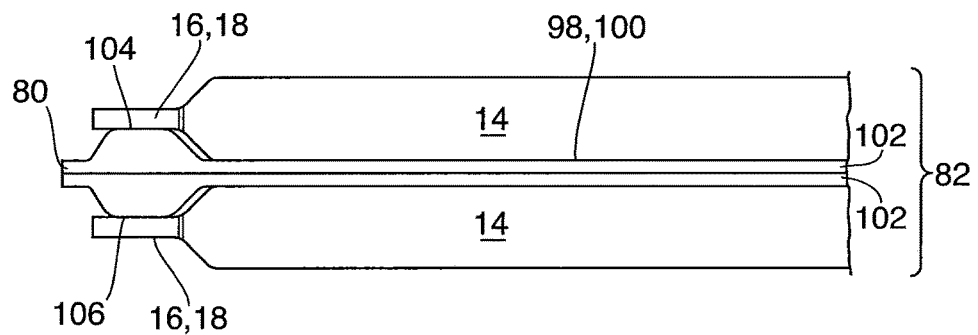

It will be appreciated that the battery module 1 of FIGS. 1 and 2 will comprise a plurality of repeating units, each comprising two battery cells 14 and one heat exchanger panel 12, and is sometimes referred to herein as a "2:1 configuration". In accordance with this 2:1 configuration, one surface of each battery cell 14 is in thermal contact with one heat exchanger panel 12, while the opposite surface faces an adjacent battery cell 14. The two adjacent battery cells 14 of each repeating unit in the 2:1 configuration may be separated from one another by a spacer pad 130, as shown in FIG. 2. The number of repeating units in the battery module 1 is variable. Although the embodiments are described herein with reference to battery modules having a 2:1 configuration, it will be appreciated that the heat exchanger panels described throughout this application may be used in heat exchangers and battery modules having different configurations. For example, the heat exchanger panels and heat exchangers described herein may be used in battery modules in which the repeating units comprise one battery cell 14 and one heat exchanger panel 12, also referred to herein as the "1:1 configuration". FIGS. 13 and 14, described below, illustrate an embodiment in which the repeating unit has a 1:1 configuration.

Each battery cell 14 has a pair of flat, opposed surfaces for contact with the heat transfer surfaces of panels 12, and a pair of tabs 16, 18 to provide an electrical connection with a bus bar (not shown), wherein the bus bar will be similarly connected to the tabs 16, 18 of the other cells 14 in the battery module 1. As shown in FIG. 1, the tabs 16, 18 will typically have a thickness which is less than that of the other portions of the battery cell 14.

During charging or discharging of the battery module 1, heat will be generated by battery cells 14. As mentioned above, the heat generated by battery cells 14 may be unevenly distributed over the surfaces of the battery cell 14, such that a temperature gradient is created along the outer surfaces of the battery cells 14, resulting in the creation of "hot spots" in one or more regions of the battery cells 14. For example, since the tabs of lithium-ion battery cells tend to develop more heat than the rest of the battery cell, each of the battery cells 14 of battery module 1 may experience a temperature gradient whereby the temperature of the battery cell 14 will be highest at or near the tabs 16, 18 (the upper portion of battery cell 14 shown in FIG. 1, in or near zone 20), due to the higher electrical current density in this region, particularly during fast charging of the battery module 1. Also, during battery discharge, under drive cycle conditions, each of the battery cells 14 may experience a temperature gradient whereby the temperature of the battery cell 14 will be highest near the central portion of the battery cell 14 (the central portion of battery cell 14 shown in FIG. 1, in or near zone 24).

In the embodiment described below, the heat exchanger panels 12 of battery module 1 are each provided with multiple cooling zones, with the zone(s) of highest cooling capacity being located closest to the tabs 16, 18 of battery cells 14, so as to avoid the creation of hot spots in the area of tabs 16, 18. It will be appreciated that the battery module 1 may include heat exchanger panels 12 in which the zone(s) of highest cooling capacity are located closest to the central portions of battery cells 14, either in addition to or instead of the heat exchanger panels 12 now described below.

In FIG. 1, the battery cell 14 is shown as having four thermal regions, each having a different temperature range and different cooling requirements. These four thermal regions are: a first thermal region 20 proximate to the tabs 16, 18, and having the highest temperature range and greatest cooling requirements; a second thermal region 22 adjacent to region 20, having a lower temperature range and cooling requirements than region 20; a third thermal region 24 adjacent to region 22, and having a lower temperature range and cooling requirements than region 22; and a fourth thermal region 26 having the lowest temperature range and cooling requirements. The divisions between thermal regions 20, 22, 24 and 26 in FIG. 1 are shown by dotted lines. Given that the battery cell 14 will have a temperature gradient across its surface (i.e. from bottom to top in FIG. 1), it will be appreciated that the division of cell 14 into four thermal regions is somewhat arbitrary, and that the number of thermal regions can be varied from that shown.

Each heat exchanger panel 12 has a pair of opposed heat transfer surfaces 28, 30 which will be in close thermal contact with one of the flat surfaces of a battery cell 14, wherein heat is transferred from cell 14 to the coolant through the heat transfer surfaces 28, 30. In order to maximize heat transfer, the heat transfer surfaces 28, 30 of panels 12 are approximately the same size, shape and area as the flat surfaces of the battery cell 14 to be cooled.

Each heat transfer surface 28, 30 of heat exchanger panel 12 is shown as being divided into four heat transfer zones, which are labeled 32, 34, 36 and 38 in FIG. 1, with the divisions between adjacent heat transfer zones being shown by dotted lines. Furthermore, each of the heat transfer zones of the heat exchanger panel 12 corresponds approximately in location, size, shape and area to one of the thermal regions of the battery cell 14. In this regard, the first heat transfer zone 32 of heat exchanger panel 12 is configured to be in contact with the first thermal region 20 of cell 14; the second heat transfer zone 34 of heat exchanger panel 12 is configured to be in contact with the second thermal region 22 of cell 14; the third heat transfer zone 36 of heat exchanger panel 12 is configured to be in contact with the third thermal region 24 of cell 14, and the fourth heat transfer zone 38 of heat exchanger panel 12 is configured to be in contact with the fourth thermal region 26 of cell 14.

While the present embodiment relates to a battery cell 14 having four thermal regions and a heat exchanger panel 12 having four heat transfer zones, it will be appreciated that this is an exemplary configuration, and the number of thermal regions and heat transfer zones may be either less or more than that which is illustrated in the drawings. For example, the invention includes embodiments in which the battery cell 14 has a first thermal region 20 proximate to the tabs 16, 18, and a second thermal region 22 distal from the tabs 16, 18, while the heat exchanger panel 12 has a first heat transfer zone 32 for thermal contact with the first thermal region 20 of cell 14, and a second heat transfer zone 34 for contact with the second thermal region 22.

As shown in FIG. 1, the heat exchanger panel 12 includes a plurality of fluid flow passages 40 to carry coolant across the surfaces 28, 30 of heat exchanger panel 12. As shown in the cross-section of FIG. 2, the fluid flow passages 40 are of substantially constant height, with the thickness of the heat exchanger panel 12 being defined by the height of the fluid flow passages 40. The fluid flow passages 40 may have flat tops and bottoms, as shown, for enhanced surface contact with battery cell 14, although the tops and bottoms of passages 40 may instead be rounded in some embodiments. The fluid flow passages 40 of heat exchanger panel 12 are shown as being relatively narrow, and do not require internal support structures in the form of dimples, ribs or turbulizers.

Each heat transfer zone of heat exchanger panel 12 is provided with a subgroup of fluid flow passages 40, wherein each of the subgroups also comprises a plurality of fluid flow passages 40. In this regard, the first heat transfer zone 32 includes a first subgroup 42 of fluid flow passages 40, the second heat transfer zone 34 includes a second subgroup 44 of fluid flow passages 40, the third heat transfer zone 36 includes a third subgroup 46 of fluid flow passages 40, and the fourth heat transfer zone 38 includes a fourth subgroup 48 of fluid flow passages 40.

Each of the first to fourth subgroups of fluid flow passages 40 has a specific fluid flow capacity, which is the sum of the fluid flow capacities of the individual fluid flow passages 40 making up the subgroup. Therefore, the fluid flow capacity of each subgroup of fluid flow passages 40 is determined partly by the number of fluid flow passages 40 making up the subgroup, and also by the fluid flow capacities of the individual fluid flow passages 40 making up the subgroup. As will be further discussed below, the fluid flow capacity of each individual fluid flow passage 40 is at least partly determined by its cross-sectional area, and by the presence or absence of any local flow restrictions in the fluid flow passage 40.

In the illustrated embodiment, for example, the first subgroup 42 comprises two fluid flow passages 40; the second subgroup 44 comprises four fluid flow passages 40; third subgroup 46 comprises five fluid flow passages 40; and the fourth subgroup 48 comprises six fluid flow passages 40. It will be appreciated, however, that the number of passages 40 in each subgroup can be varied from that shown in the drawings, and that the number of fluid flow passages 40 is only one parameter which influences the fluid flow capacity of the subgroups. Despite the increase in the number of fluid flow passages 40 from the first to fourth subgroups, the fluid flow capacities of the subgroups decreases with increasing distance from the tabs 16, 18 of battery cell 14. This will be discussed further below.

The heat exchanger panel 12 further comprises a fluid inlet opening 50 through which coolant enters the heat exchanger panel 12, and which is in flow communication with at least one fluid inlet passage 52, each of which is in the form of an elongate header communicating with a subgroup of fluid flow passages 40. Heat exchanger panel 12 further comprises a fluid outlet opening 54 through which coolant is discharged from heat exchanger panel 12, and which is in flow communication with at least one fluid outlet passage 56, each of which is in the form of an elongate header communicating with a subgroup of fluid flow passages 40. Although not shown in the drawings, the fluid inlet openings 50 of heat exchanger panels 12 making up heat exchanger 10 will be connected to a coolant inlet manifold and the fluid outlet openings 54 of heat exchanger panels 12 will be connected to a coolant outlet manifold, wherein the inlet and outlet manifolds are in flow communication with a coolant circulation system which may include a pump and a fan-cooled radiator or other heat exchanger to discharge heat from the coolant.

In the illustrated embodiment, the heat exchanger panel 12 includes four fluid inlet passages 52, all of which are in flow communication with a single fluid inlet opening 50, and four fluid outlet passages 56, all of which are in flow communication with a common fluid outlet opening 54. The fluid inlet and outlet passages 52, 56 may have flat tops and bottoms, as shown in FIG. 2, for enhanced surface contact with the surfaces of battery cell 14, although the tops and bottoms of passages 40 may instead be rounded in some embodiments. The fluid inlet and outlet passages 52, 56 are shown as being relatively narrow, and do not require internal support structures in the form of dimples, ribs or turbulizers.

Each of the fluid flow passages 40 has a first end 58 through which it is connected to one of the fluid inlet passages 52, and a second end 60 through which it is connected to one of the fluid outlet passages 56. Therefore, coolant received through the fluid inlet opening 50 flows through the at least one fluid inlet passage 52 to the fluid flow passages 40, flows from the first ends 58 to the second ends 60 of the fluid flow passages 40 to the at least one fluid outlet passage 56, and then flows through the at least one fluid outlet passage 56 to the fluid outlet opening 54.

The heat exchanger panel 12 may be formed from a pair of identical sheets 62 which are stamped with a pattern of raised areas and lowered areas which will form the fluid flow passages 40 and the fluid inlet and outlet passages 52, 56 when the sheets 62 are brought together in face-to-face contact. The peripheral edges and the lowered areas of sheets 62 are sealingly joined together, for example by brazing, so as to form flat areas 64 separating the fluid flow passages 40 and the inlet and outlet passages 52, 56, and extending along the outer peripheral edges of the heat exchanger panel 12. In the following description, the flat areas 64 between the fluid flow passages 40 are sometimes referred to as "ribs".

No coolant flows through the flat areas 64. The widths of the flat areas 64 may be minimized so as to maximize the area of heat exchanger panel 12 occupied by fluid flow passages 40, and the fluid-inlet and outlet passages 52, 56. Also, although all the fluid flow passages 40 are shown in FIG. 2 as having the same width, it will be appreciated that they may be of different widths along at least a portion of their lengths.

Heat exchanger 10 includes a number of enhancements to minimize the pressure drop of a coolant flowing through the heat exchanger panels 12. Reducing pressure drop in the heat exchanger panels 12 enables the coolant to flow through the heat exchanger panels 12 at a higher flow rate, thereby increasing the amount of heat removed from the battery cells 14. The inventors have found that a heat exchanger panel 12 configured as shown in FIG. 1 has a pressure drop of 2.3 kPa at a flow rate of 60 ml/min. In contrast, a heat exchanger panel according to the prior art having a serpentine flow path has a pressure drop of 16 kPa at a flow rate of 60 ml/min.

In the present embodiment, pressure drop is minimized by providing fluid flow passages 40 which are predominantly straight and parallel to one another. In this configuration, the first end 58 of each fluid flow passage 40 is connected to one of the fluid inlet passages 52 at an angle of about 90 degrees and the second end 60 of each of each fluid flow passage 40 is connected to one of the fluid outlet passages 56 at an angle of about 90 degrees.

Also, with the possible exception of fourth subgroup 48, the fluid flow passages 40 within each of subgroups 42, 44 and 46 are substantially straight and parallel to one another, and are also substantially parallel to the fluid flow passages 40 of the other subgroups 42, 44 and 46. In the fourth subgroup 48, some of the fluid flow passages 40 (i.e. the three lowest fluid flow passages 40 in FIG. 1) deviate somewhat from a straight, parallel configuration in order to provide coolant distribution over a portion of the fourth heat transfer zone 38 which falls between the fluid inlet passages 52, fluid outlet passages 56 and the fluid flow passages 50. However, even in the fourth subgroup 48, the fluid flow passages 40 have only minor deviations from a straight, parallel configuration, and undergo much smaller changes in direction than a flow passage in a conventional panel which may undergo several 90 or 180 degree changes in direction as it flows through the panel. For example, the three lowest fluid flow passages 40 in the fourth subgroup 48 undergo changes in direction which are less than 90 degrees in total.

Further, the parallel fluid flow passages 40 are generally oriented along a first axis of heat exchanger panel 12, being parallel to the horizontal direction in FIG. 1, while the fluid inlet and outlet passages 52, 56 are generally oriented along a second axis of heat exchanger panel 12 along at least a portion of their lengths, wherein the second axis is parallel to the vertical direction in FIG. 1 and is substantially perpendicular to the first axis. In this regard, each pair of fluid inlet and outlet passages 52, 56 is shown as being straight and parallel to the second axis at least in areas where they are connected to the ends 58, 60 of the fluid flow passages 40. Furthermore, the fluid inlet and outlet passages 52, 56 in the illustrated embodiment are located proximate to peripheral edges of the heat exchanger panel 12 (i.e. the vertical edges in FIG. 1), at least in areas where they are connected to the ends 58, 60 of the fluid flow passages 40, to maximize the areas of heat transfer surfaces 28, 30 through which coolant is circulated. Thus, with the arrangement of FIG. 1, the fluid inlet and outlet passages 52, 56 and the fluid flow passages describe numerous generally U-shaped passages which together provide substantially complete coverage of the heat transfer surfaces 28, 30, while providing much lower pressure drop than serpentine channels of a prior art heat exchanger panel.

It will be appreciated that widening the fluid flow passages 40 and/or the fluid inlet and outlet passages 52, 56 is another way to lower pressure drop, although this may require dimples and/or other structural features to provide support for the wider passages. The present embodiment allows passages 40, 52 and 56 to maintain a relatively narrow width, so as to avoid the need for structural supports within the channels, while maintaining low pressure drop.

Numerous variations to the number and configurations of the passages 40, 52 and 56 are possible, while maintaining a low pressure drop. Some of these exemplary variations are now described below with reference to FIGS. 3 to 6, which are simplified plan views of heat exchanger panels 12 in which passages 40, 52 and 56 are shown as simple lines.

Figure 3:
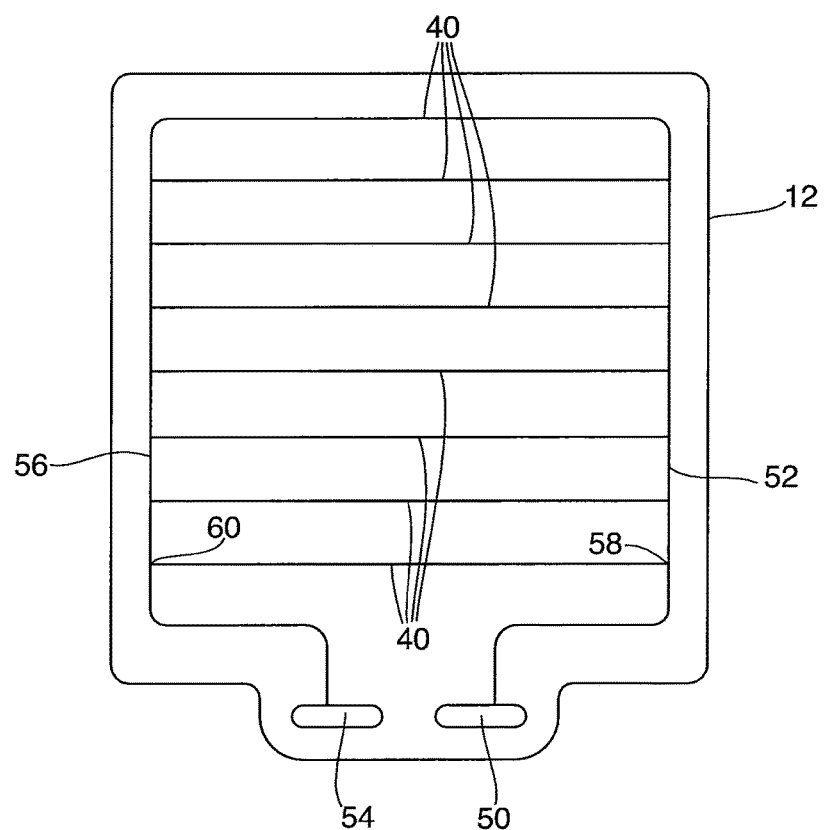
FIGS. 3-6 are simplified plan views of various heat exchanger panels having parallel arrangements of fluid flow channels.

FIG. 3 illustrates an embodiment of a heat exchanger panel 12 which has only a single fluid inlet passage 52, a single fluid outlet passage 56, and a plurality of fluid flow passages 40 extending between the fluid inlet and outlet passages 52, 56, representing the simplest arrangement of passages 40, 52 and 56 in accordance with the invention. Although not shown in FIG. 3, different heat transfer zones and/or a graded flow distribution can be created by varying the widths of channels 40, 52 and 56 and/or by providing localized flow restrictions, as will be further described below.

Figure 4:
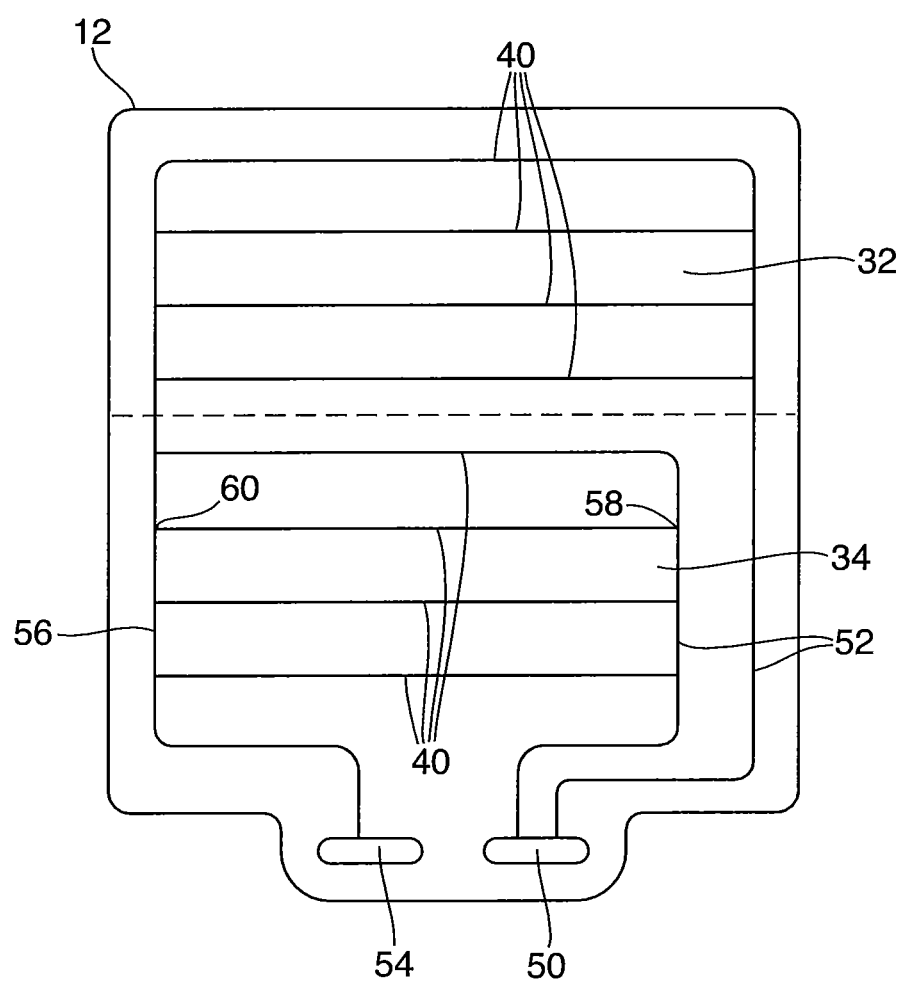

FIG. 4 illustrates an embodiment of a heat exchanger panel 12 in which two fluid inlet passages 52 are provided, a first fluid inlet passage 52 being in flow communication with the first ends 58 of a first subgroup 42 of fluid flow passages 40, and a second fluid inlet passage 52 being in flow communication with the first ends 58 of a second subgroup 44 of fluid flow passages 40. In this embodiment, only a single fluid outlet passage 56 is provided, which is in flow communication with the second ends 60 of all the fluid flow passages 40. This arrangement creates first and second heat transfer zones 32, 34 which are shown as being separated by a dotted line.

Figure 5:
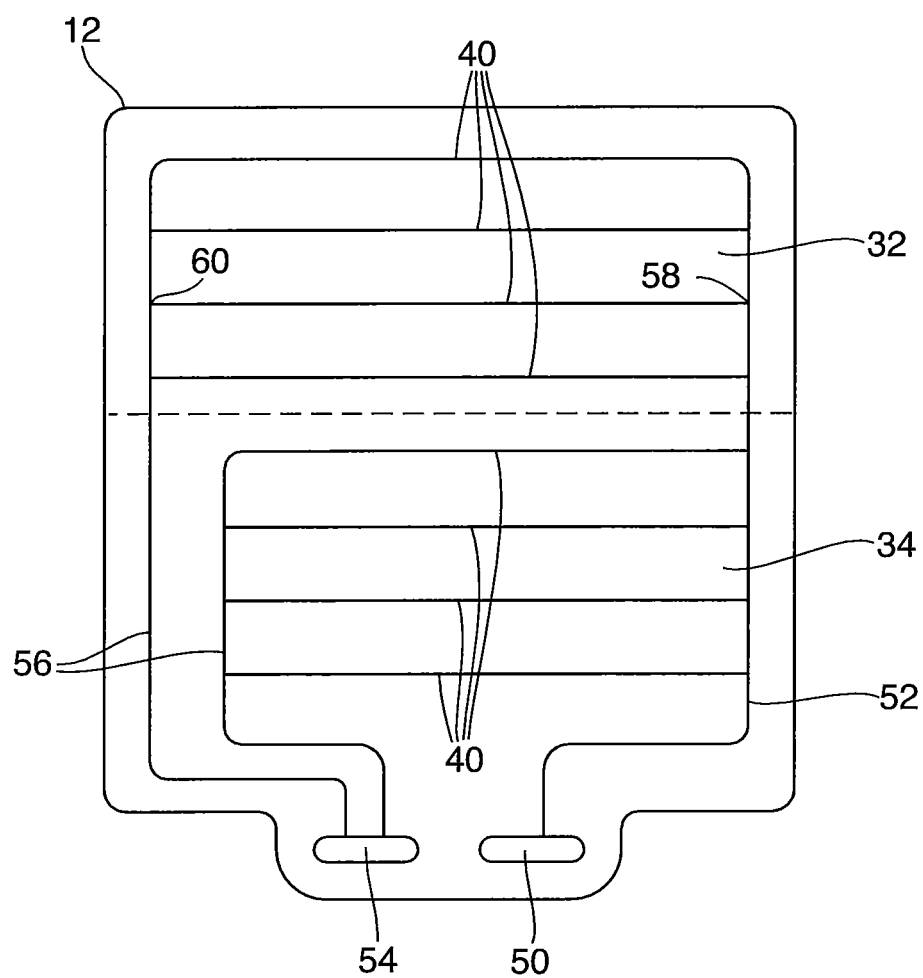

FIG. 5 similarly illustrates an embodiment of a heat exchanger panel 12 in which only a single fluid inlet passage 52 is provided, which is in flow communication with the first ends 58 of all the fluid flow passages 40. In this embodiment, two fluid outlet passages 56 are provided, a first fluid outlet passage 56 being in flow communication with the second ends 60 of a first subgroup 42 of fluid flow passages 40, and a second fluid outlet passage 52 being in flow communication with the second ends 60 of a second subgroup 44 of fluid flow passages 40. This arrangement also creates first and second heat transfer zones 32, 34 which are shown as being separated by a dotted line. The embodiments of FIGS. 4 and 5 illustrate that the number of fluid inlet passages 52 is not necessarily the same as the number of fluid outlet passages 56.

Figure 6:
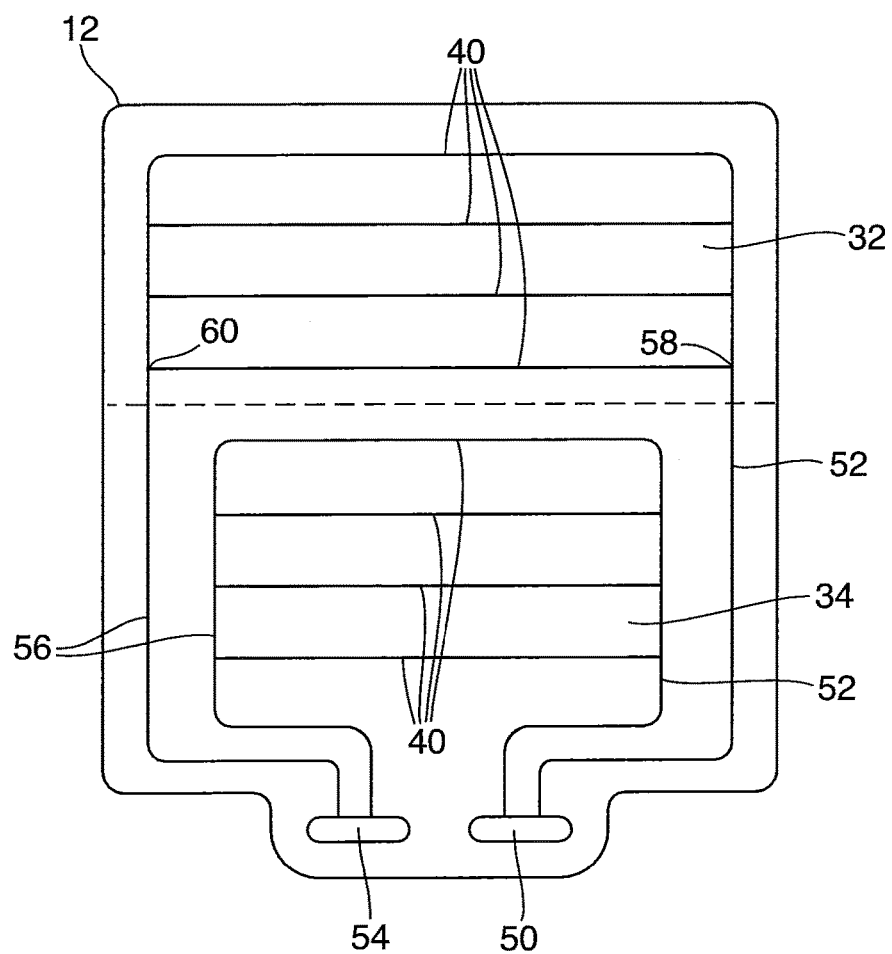

FIG. 6 illustrates an embodiment of a heat exchanger panel 12 in which two fluid inlet passages 52 and two fluid outlet passages 56 are provided, wherein the first fluid inlet passage 52 and first fluid outlet passage 56 are in flow communication with a first subgroup 42 of fluid flow passages 40, and a second fluid inlet passage 52 and second fluid outlet passage 56 are in flow communication with a second subgroup 44 of fluid flow passages 40. This arrangement also creates first and second heat transfer zones 32, 34 which are shown as being separated by a dotted line.

Figure 7:
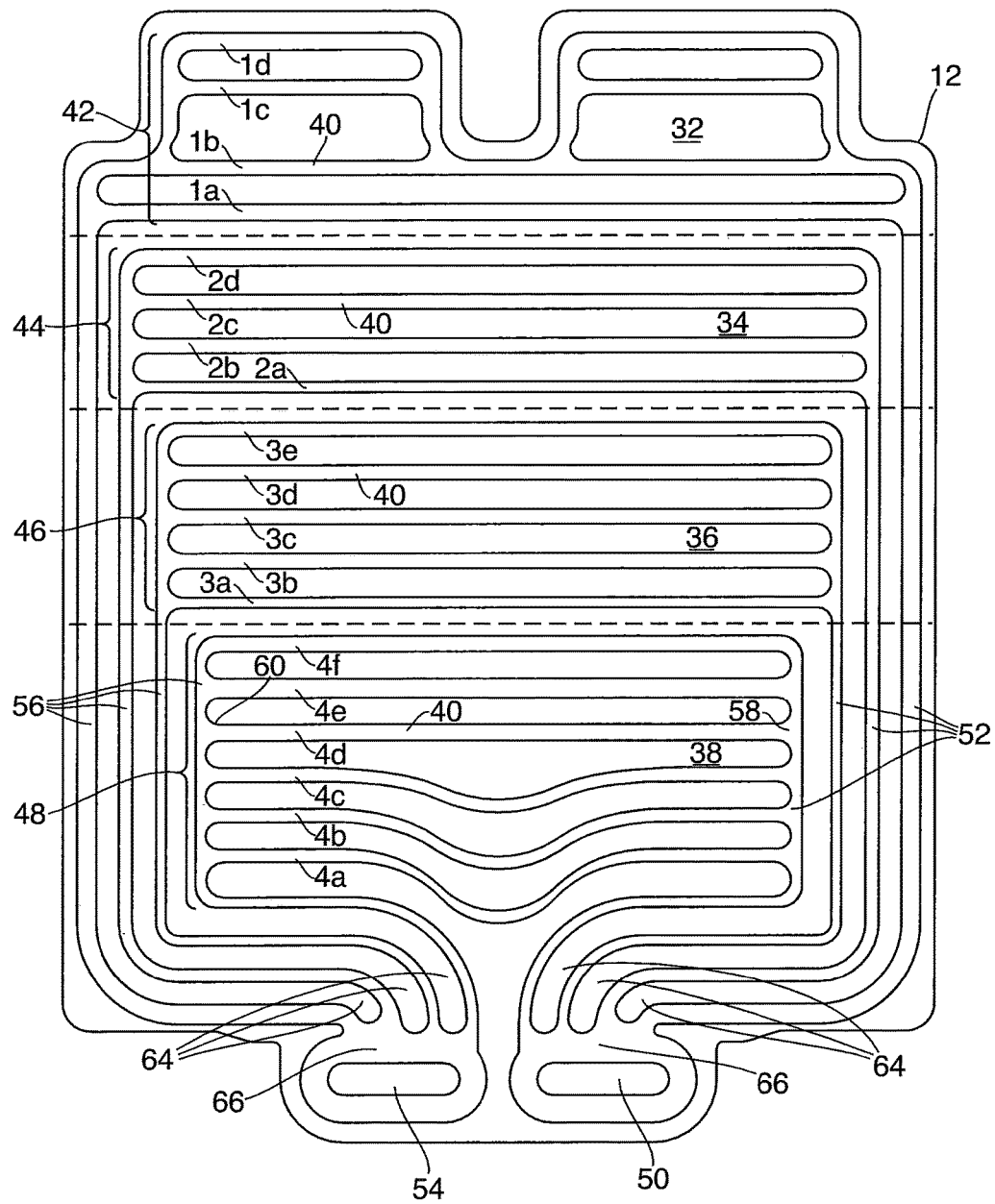
FIG. 7 is a plan view of a heat exchanger panel according to a further embodiment.

FIG. 7 shows a heat exchanger panel 12 which has a high degree of similarity to heat exchanger panel 12 of FIG. 1, and is similarly provided with four heat transfer zones 32, 34, 36, 38. The second, third and fourth heat transfer zones 34, 36, 38 of the heat exchanger panel 12 of FIG. 7 have substantially the same configuration as the corresponding zones of FIG. 1. However, the uppermost heat transfer zone 32 of heat exchanger panel 12 in FIG. 7 is shown as being extended upwardly into the region of tabs 16, 18 of battery cell 14, including additional fluid flow passages 40 (also labeled 4c and 4d in FIG. 7) which circulate coolant through this area. Therefore, the heat exchanger panel 12 of FIG. 7 is adapted to remove heat directly from the tabs 16, 18, in addition to removing heat from the first to fourth thermal regions 20, 22, 24, 26 of the battery cell 14. Direct cooling of tabs 16, 18 is also beneficial because the tabs 16, 18 are connected to high thermal conductivity aluminum and copper sheets (not shown) which can remove heat from the middle of the battery cell 14. Therefore, extension of heat transfer zone 32 into the tab region may remove some of the heat conducted from the middle of cell 14 by the conductive sheets.

As shown in FIG. 1, the battery tabs 16, 18 are thinner than the remainder of battery cell. Therefore, in order to provide intimate contact between the heat exchanger panel 12 and tabs 16, 18, the thickness of the heat transfer zone 32 in the tab region may be thicker than the remainder of heat exchanger panel 12 as will be further described below in connection with the embodiment of FIGS. 13 to 15.

In addition to providing reduced pressure drop, the heat exchanger panels 12 described herein also include flow adjustment features which produce differences in flow capacity between different subgroups of fluid flow passages 40 so as to provide multiple heat transfer zones of different cooling capacities. Some of the heat exchanger panels 12 described herein include flow adjustment features which produce differences in the fluid-carrying capacities of the fluid flow passages 40 within one or more of the subgroups, so as to provide the heat exchanger panel 12 with a graded cooling capacity across its surface. Some of these embodiments are now described below with reference to FIGS. 1, 7 and 8.

Firstly, FIGS. 1 and 7 illustrate that the flow capacities of the various subgroups of fluid flow passages 40 can be adjusted by making changes to the cross-sectional areas of the fluid flow passages 40, the fluid inlet passages 52 and/or the fluid outlet passages 56. Because the height of passages 40, 52 and 56 is fixed by the thickness of the heat exchanger panel 12, changing the cross-sectional areas of the passages 40, 52 and 56 is accomplished by changing their widths.

For example, in FIGS. 1 and 7, the heat exchanger panels 12 shown therein include four fluid inlet passages 52, each feeding a different heat transfer zone 32, 34, 36, 38. The width of the fluid inlet passage 52 feeding coolant to the first heat transfer zone 32, which is at or near the region of tabs 16, 18, is greater than that of the fluid inlet passages 52 feeding the other heat transfer zones, while the width of the fluid inlet passage 52 feeding the fourth heat transfer zone 38, which is furthest from the tabs 16, 18, is narrower than the other fluid inlet passages 52. The widths of the fluid inlet passages 52 feeding the second and third heat transfer zones 34, 36 are intermediate between those of the first and fourth heat transfer zones 32, 38, with the fluid inlet passage 52 feeding coolant to the second heat transfer zone 34 being wider than the fluid inlet passage 52 feeding coolant to the third heat transfer zone 36. It can be seen that varying the width of fluid inlet passages in this manner will result in the pressure drop increasing from the widest fluid inlet passages 52 to the narrowest fluid inlet passages 52, and therefore the coolant flow rate through the first heat transfer zone 32 will be the greatest while the coolant flow rate through the fourth heat transfer zone 38 will be the lowest.

Similarly, as shown in FIGS. 1 and 7, the widths of the fluid outlet passages 56 can be varied in a similar manner, and will result in a similar effect on the pressure drop and coolant flow rates in the four heat transfer zones 32, 34, 36, 38. In these embodiments, the width of the fluid outlet passage 56 discharging coolant from the first heat transfer zone 32 is the greatest, while that of the fluid outlet passage 56 discharging coolant from the fourth heat transfer zone 38 is the least.

In a similar manner, the widths of the fluid flow passages 40 within the respective heat transfer zones may differ from one another to produce a similar effect on the pressure drop and coolant flow rates in the four heat transfer zones 32, 34, 36, 38. For example, the widths of the fluid flow passages 40 of the first subgroup 42, located in the first heat transfer zone 32, may be greater than the widths of fluid flow passages 40 in the other subgroups, with the widths of the fluid flow passages 40 in the fourth subgroup 48 being the least.

It will be appreciated that the above-described variations in the width of passages 40, 52 and 56 may be used alone or in combination with one another. For example, the heat exchanger panel 12 may be provided with fluid inlet passages 52 of different widths, while maintaining constant width in the fluid outlet passages 56 and fluid flow passages 40; the fluid outlet passages 56 may be of different widths while maintaining constant width in the fluid inlet passages 52 and fluid flow passages 40; or the fluid flow passages 40 of the different zones may be of different widths, while maintaining constant width in the fluid inlet and outlet passages 52, 56.

In addition to, or instead of adjusting the widths of passages 40, 52, 56, the heat exchanger panels 12 of FIGS. 1 and 7 include an additional feature for providing the heat transfer zones 32, 34, 36, 38 with different cooling capacities. This additional feature is now described below with reference to FIG. 8, showing a close-up of the region surrounding the fluid outlet opening 54 of heat exchanger panel 12 of FIG. 1 or 7.

Figure 8:
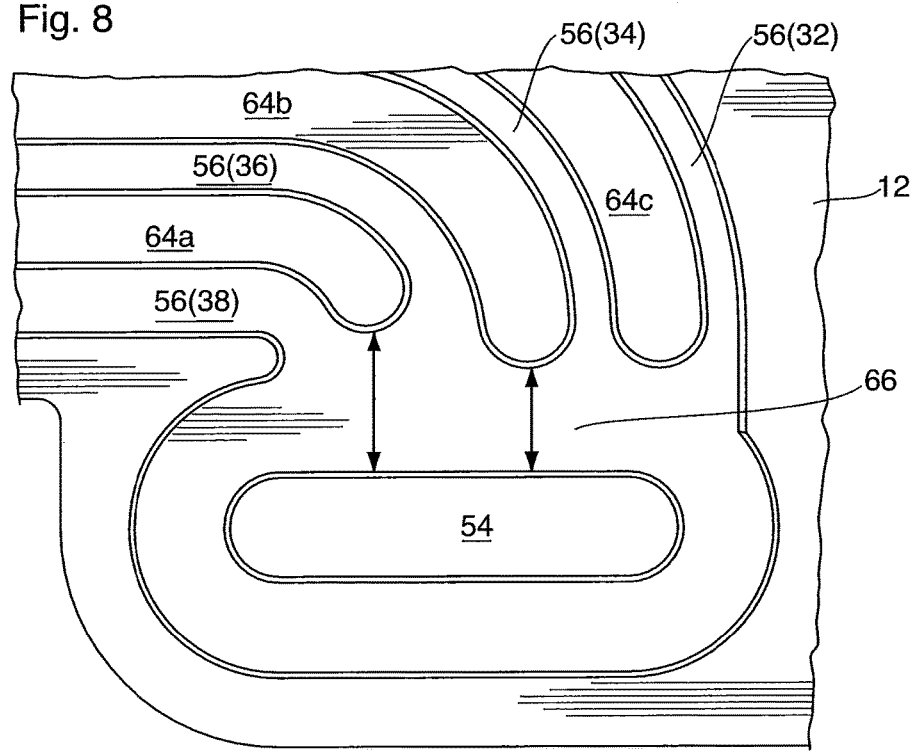
FIG. 8 is a close-up of the region surrounding the outlet opening of the heat exchanger panel shown in FIG. 1 or FIG. 7.

FIG. 8 shows the four fluid outlet passages 56 for carrying fluid from heat transfer zones 32, 34, 36 and 38. For clarity, the four fluid outlet passages 56 shown in FIG. 8 are identified as 56(32), 56(34), 56(36) and 56(38) to connect them with their respective heat transfer zones.

It can be seen from FIG. 8 that the four fluid outlet passages 56 are separated from one another by three ribs 64, which are identified in FIG. 8 as 64a, 64b and 64c. As shown, the tips or terminal ends of the ribs 64a, 64b and 64c are spaced from the edge of fluid outlet opening 54, such that a fluid distribution space 66 is created between the edge of fluid outlet opening 54 and the terminal ends of ribs 64*a*, 64*b* and 64*c*. The coolant from each of the four fluid outlet passages 56 will enter this fluid distribution space 66. However, in the configuration shown in FIG. 8, there will not be an equal distribution of coolant between the four fluid outlet passages 56.

As shown in FIG. 8, a distance 68 between ribs 64*b* and 64*c* and fluid outlet opening 54 is less than a distance 70 between rib 64*a* and fluid outlet opening 54. In other words, the tip or terminal end of rib 64*a* is farther from the edge of fluid outlet opening 54 than the tips or terminal ends of ribs 64*b* and 64*c*. Thus, the "frontal area" of fluid outlet passages 56(32) and 56(34), which are separated by ribs 64*a*, is greater than the frontal area of fluid outlet passages 56(36) and 56(38). As a result of this increased frontal area, the coolant in fluid outlet passages 56(32) and 56(34) will experience a lower pressure drop as it flows into the distribution area 66, thus creating differences in flow capacity between the fluid outlet passages 56. The feature illustrated in FIG. 8 can be incorporated into the heat exchanger panel 12 on its own, or in combination with the variations in width of passages 40, 52 and/or 56 described above. It will also be appreciated that the spacing between the edge of fluid outlet opening 54 and ribs 64*b* and 64*c* is not necessarily the same, but may rather be different so as to create differences in flow capacity between fluid outlet passages 56(36) and 56(38). It will be appreciated that a similar distribution area 66 may be provided between the fluid inlet opening 50 and the ends of the ribs 64 separating the four fluid inlet passages 52 from one another, to produce the above-mentioned effects, and this arrangement is shown in FIG. 7.

It will be appreciated that the flow adjustment features described above will produce variations in the flow capacities of the various heat transfer zones 32, 34, 36, 38. Alternatively, or in addition to providing variations in the flow capacities between the different heat transfer zones, the heat exchanger panels 12 may be provided with flow adjustment features for creating variations of the fluid-carrying capacities of the fluid flow passages 40 within one or more of the heat transfer zones. This provides a graded cooling capacity within one or more of the heat transfer zones. This aspect of the invention is now described with reference to FIGS. 1 and 7.

For ease of explanation, the fluid flow passages 40 of the second to fourth heat transfer zones 34, 36, 38 in FIGS. 1-7 are labeled as 2*a*-2*d*, 3*a*-3*e* and 4*a*-4*f*, respectively. In FIG. 1 the fluid flow passages 40 of the first heat transfer zone 32 are labeled as 1*a*-1*b*, and in FIG. 7 these passages 40 are labeled as 1*a*-1*d*.

It can be seen that the widths of the fluid flow passages 40 in the second to fourth heat transfer zones 34, 36, 38 increase from the bottom to the top of the heat transfer zone. Thus, the fluid flow passages 40 within each of these heat transfer zones increase in width toward the top of the heat exchanger panel 12, which will be in contact with the hottest portion of battery cell 14, and the cooling capacity within these heat transfer zones similarly increases toward the top of the heat exchanger panel 12.

It can also be seen from FIGS. 1 and 7 that the widths of the fluid flow passages 40 in the second to fourth heat transfer zones 34, 36, 38 are similar to one another. More specifically the fluid flow passages 40 labelled as 2*a*, 3*a* and 4*a* may be of the same or similar width; the fluid flow passages 40 labelled as 2*b*, 3*b* and 4*b* may be of the same or similar width, etc. Thus, while there is a graded cooling capacity within these heat transfer zones 34, 36, 38, the widths of the fluid flow passages 40 in one heat transfer zone may be the same or similar to the widths of the fluid flow passages 40 in one or more of the other heat transfer zones. Therefore, in the embodiments of FIGS. 1 and 7, the differences in the flow capacity and the cooling capacity within the various heat transfer zones 32, 34, 36, 38 is largely determined by the widths of the fluid inlet and outlet passages 52, 56, whereas the differences in flow capacity and cooling capacity within the second to fourth heat transfer zones 34, 36, 38 is determined by the differences in width of the individual fluid flow passages 40 within these heat transfer zones 34, 36, 38.

In the first heat transfer zone 32 in each of FIGS. 1 and 7, there is less differentiation in the widths of the fluid flow passages 40. In this zone 32, which has the highest cooling capacity, the widths of fluid flow passages 40 will be in the higher end of the range. Therefore, the fluid flow passages 40 labeled 1*a*-1*b* in FIG. 1 and the fluid flow passages 40 labeled 1*a*-1*d* in FIG. 7 may be of the same or similar width as the fluid flow passages 40 labeled as 2*c*-2*d*, 3*d*-3*e* and 4*e*-4*f* in the second to fourth heat transfer zones 34, 36, 38. It will be appreciated, however, that the widths of the fluid flow passages 40 in the first heat transfer zone 32 may have the same or similar gradations in width as are shown in the second to fourth heat transfer zones 34, 36, 38.

The flow adjustment features discussed above with reference to FIGS. 1, 7 and 8 for providing different flow and cooling capacities between the various heat transfer zones, and within each heat transfer zone, provide a great deal of flexibility in the design of heat exchanger panels 12 for cooling battery cells 14. However, it will be appreciated that the flow adjustment features discussed above must be formed during stamping of the individual sheets 62 making up the heat exchanger panels 12, and will typically be applied to all the heat exchanger panels 12 in the battery 10. This may be limiting in some applications, for example where not all the heat exchanger panels 12 in the battery 10 will have exactly the same coolant flow distribution.

Therefore, in some embodiments, the heat exchanger panels 12 may alternatively or additionally be provided with flow adjustment features which are adapted to provide different flow and cooling capacities between and/or within the various heat transfer zones, wherein these flow adjustment features can be added to the heat exchanger panels 12 either during or after stamping of sheets 62, and/or during or after assembly of sheets 62 to form heat exchanger panels 12. These flow adjustment features will take the form of local flow restrictions in at least some of the fluid flow passages 40 of one or more subgroups 42, 44, 46, 48, and/or in the fluid inlet and outlet passages 52, 56. These features are now described below with reference to FIGS. 9 to 11.

Figure 9:
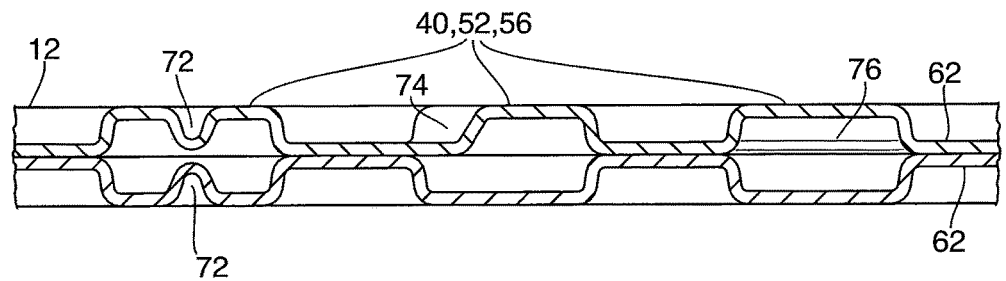
FIGS. 9 to 11 are partial views of heat exchanger panels illustrating various types of flow restrictions.

FIG. 9 is a partial cross-sectional view through a heat exchanger panel 12, illustrating three flow passages, which may be fluid flow passages 40, fluid inlet passages 52 or fluid outlet passages 56. Each of the three flow passages illustrated in FIG. 9 has a different form of local deformation. The flow passage on the left side of FIG. 9 is provided with dimples 72 in both the top and bottom walls of the passage. These dimples 72 may be provided in only the top or bottom wall of the passage as shown in the left passage of FIG. 10, depending on the desired degree of flow restriction. The dimples 72 will locally reduce the cross-sectional area of the passage, creating a pinch point which will restrict flow through the passage, providing an effect similar to that of reducing the width of the passage. The sizes of dimples 72 may be varied to vary the degree of flow restriction.

Figure 10:
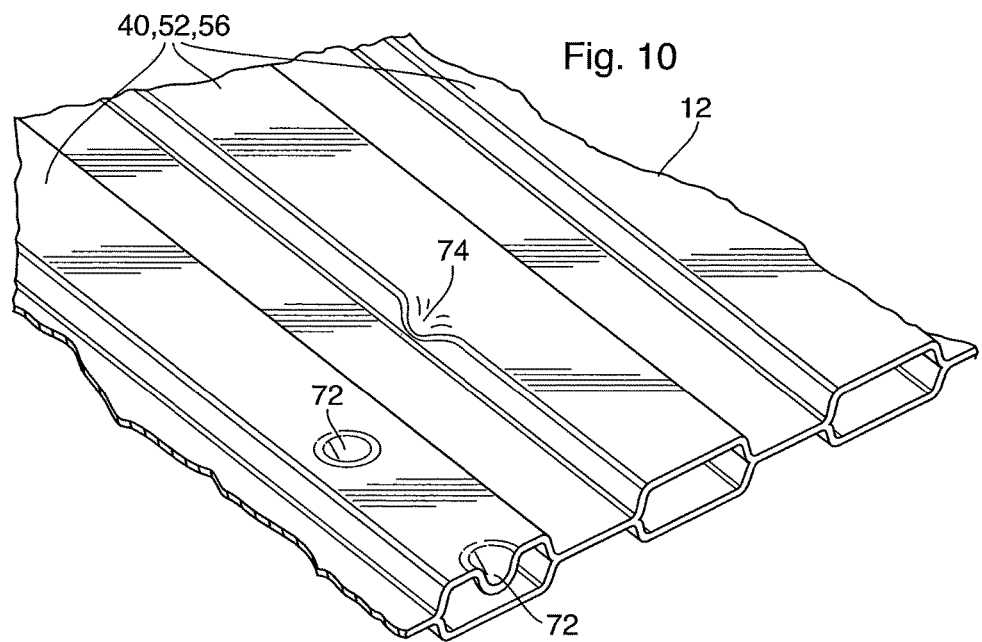

The middle flow passage of FIG. 9, and the middle flow passage of FIG. 10, is provided with a side deformation 74 in which one side of the passage is crushed or pushed in, thereby locally reducing the cross-sectional area of the passage and creating a pinch point which restricts flow through the passage. These side deformations 74 may be provided on both sides of the passage, or in the top and bottom thereof, and may be of variable size, depending on the desired degree of flow restriction.

Figure 11:
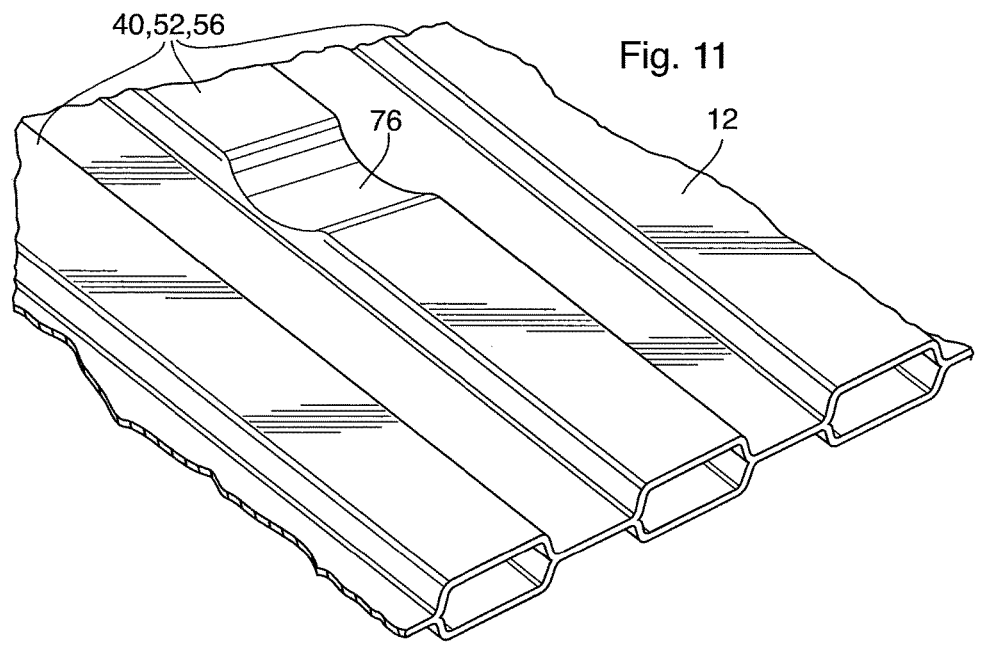

The right flow passage of FIG. 9 and the middle flow passage of FIG. 11 are both provided with a deformation 76 in the top of the passage which extends across its entire width. This deformation 76 is similar to a rib extending transversely across the passage. These ribs 76 may be provided in the top and bottom wall of passage and may be of variable size, depending on the desired degree of flow restriction.

It will be appreciated that the local deformations can have various sizes and shapes in addition to those shown in the drawings. The local deformations can be formed by striking the flow passage with tooling, either before or after sheets 62 are assembled to form panels 12.

Figure 12A:
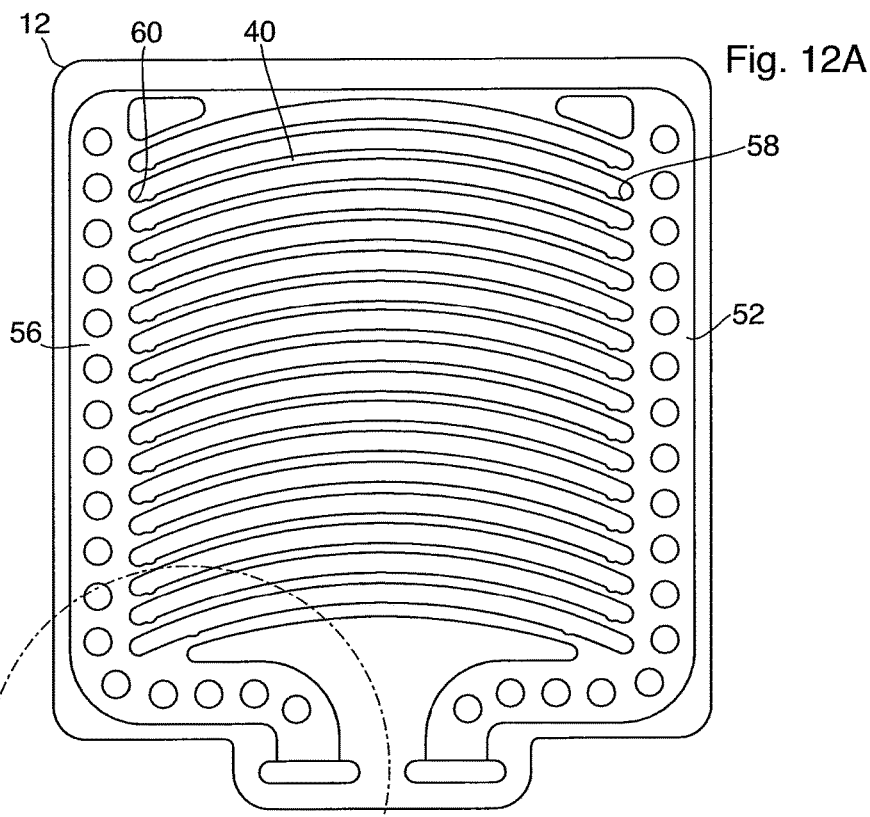
FIGS. 12A and 12B show a heat exchanger panel according to another embodiment.
Figure 12B:
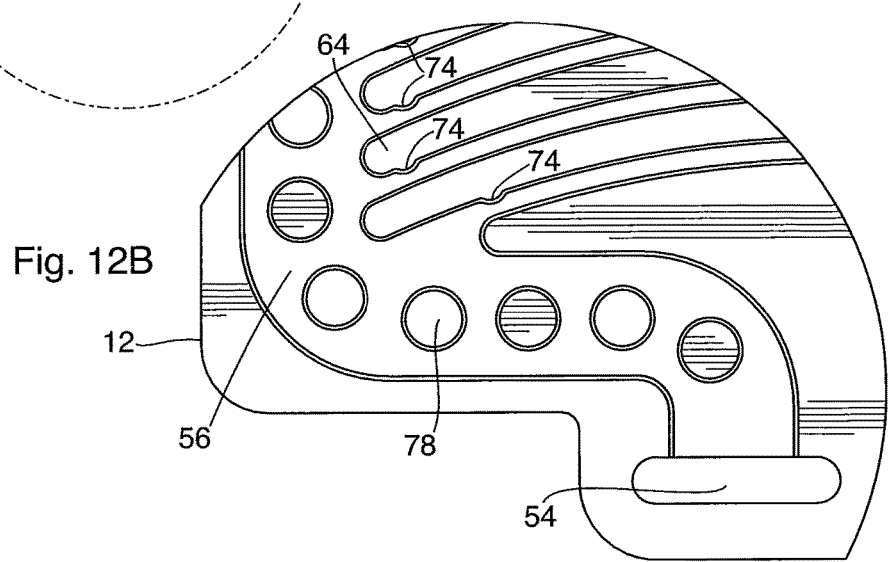

FIGS. 12A and 12B illustrate a heat exchanger panel 12 according to an embodiment, which is similar to heat exchanger panel 12 shown in FIG. 3 having a single fluid inlet passage 52 and a single fluid outlet passage 56. According to this embodiment, the fluid inlet and outlet passages 52, 56 are made to be significantly wider than the fluid inlet and outlet passages 52, 56 of the embodiments described above. In order to provide structural reinforcement, these fluid inlet and outlet passages 52, 56 are provided with flat-bottomed dimples 78 in the top and bottom sheets 62 of heat exchanger panel 12, these flat-bottomed dimples 78 being formed during stamping of the plates. The flat bottoms of flat-bottomed dimples 78 in the top and bottom sheets 62 are sealingly joined together by brazing, in an identical manner as the other flat areas 64 making up the heat exchanger panel 12.

The heat exchanger panel of FIGS. 12A and 12B include a plurality of fluid flow passages 40 branching out from the fluid inlet and outlet passages 52, 56. While these fluid flow passages are slightly curved, they can be regarded as being substantially straight and parallel to one another, thereby providing the heat exchanger panel 12 with a low pressure drop.

The heat exchanger panel 12 of FIGS. 12A and 12B may be provided with two or more distinct heat transfer zones across its flat surfaces 28, 30, or it may be provided with a single heat transfer zone having a graded cooling capacity from the bottom to the top of the heat exchanger panel 12. These configurations can be achieved by either varying the widths of the fluid flow passages 40 as described above with reference to FIGS. 1 and 7, and/or by providing the fluid flow passages 40 with local deformations, as described above with reference to FIGS. 9 to 11. In the specific embodiment of FIGS. 12A and 12B, the fluid flow passages 40 are all of substantially the same width, and local deformations are used to restrict fluid flow through at least some of the fluid flow passages 40. This can best be seen in FIG. 12B, which shows the fluid flow passages 40 near the bottom of heat exchanger panel 12 having side deformations 74 close to their second ends 60. As shown in FIG. 12A, similar side deformations 74 may be provided close to the first ends 58 of fluid flow passages 40. Multiple heat transfer zones or graded cooling capacity may be created by either providing these local deformations 74 in the fluid flow passages 40 near the bottom of the heat exchanger panel 12 and not restricting the flow capacity through the fluid flow passages 40 near the top of the heat exchanger panel 12. Alternatively, as shown, the local deformations 74 may be reduced in size from the bottom to the top of the heat exchanger panel 12, thereby providing heat exchanger panel 12 with increased flow and cooling capacity from the bottom to the top thereof.

Figure 15:
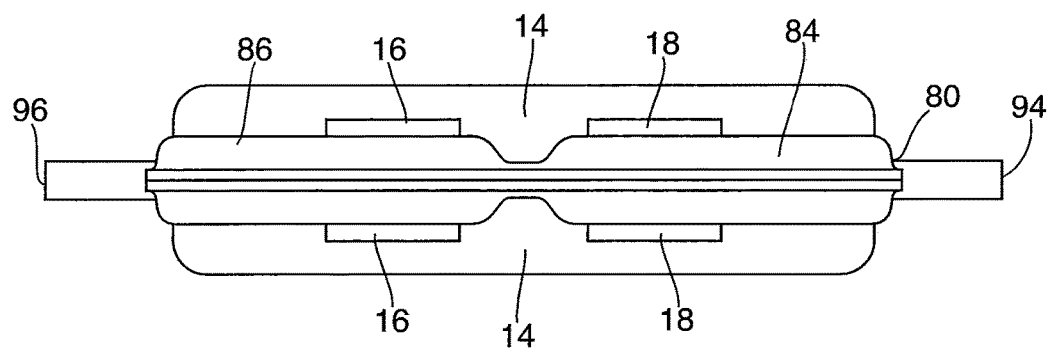
FIG. 15 show an end view of a heat exchanger panel having an enlarged header for battery tab cooling, according to another embodiment.

As discussed above with reference to FIG. 7, the areas of the heat exchanger panels can be extended into the region of the tabs 16, 18 of the battery cell 14. The following is a description of a heat exchanger 82 according to a further embodiment, constructed from a plurality of heat exchanger panels 80 as shown in FIGS. 13 to 15. The heat exchanger panels 80 are arranged in spaced, parallel relation to one another, wherein the spacing between adjacent heat exchanger panels 80 is sufficient to receive a battery cell 14 in close thermal contact with the heat transfer surfaces of the adjacent heat exchanger panels 80. FIGS. 14 and 15 illustrate a single battery cell 14 received between a pair of adjacent heat exchanger panels 80, however, it will be appreciated that the heat exchanger 82 may include additional battery cells 14 received between additional pairs of spaced apart heat exchanger panels 80, so as to form a battery module similar to battery module 1 described above, comprising a plurality of heat exchanger panels 80 and a plurality of battery cells 14 in alternating arrangement.

The heat exchanger panel 80 has a "two-pass" configuration, including an inlet header 84 and outlet header 86 arranged at a first end 90 of the panel 80, and a turnaround header 88 at an opposite, second end 92 of the panel 80. The inlet and outlet headers 84, 86 each extend across half the width of the heat exchanger panel 80, and are provided with respective inlet and outlet openings 94, 96 through which a liquid coolant is received and discharged from the heat exchanger panel 80. The turnaround header 88 extends across the entire width of the heat exchanger panel 80.

Extending lengthwise between the first and second ends 90, 92 of the heat exchanger panel 80 are a plurality of inlet flow passages 98 extending from the inlet header 84 to the turnaround header 88, and a plurality of outlet flow passages 100 extending from the turnaround header 88 to the outlet header 86. The inlet and outlet flow passages 98, 100 are analogous to the fluid flow passages 40 of the embodiments described above, and may similarly have flat top and bottom surfaces for improved contact with the flat surfaces 28, 30 of the battery cells 14. Furthermore, the construction of heat exchanger panel 80 may be similar to that of heat exchanger panel 12 described above, being constructed from a pair of identical stamped sheets 102 arranged in face-to-face relation, with flat areas between the flow passages 98, 100 and the peripheral edges of the sheets 102 being sealingly joined together, for example by brazing.

In the embodiment shown in FIGS. 13 and 14, the first end 90 of heat exchanger panel 80 is located at the end of battery cell 14 which is distal to the tabs 16, 18. This arrangement may be desirable in some applications, as it places the fluid connections at the inlet and outlet 94, 96 as far away as possible from the area of tabs 16, 18, at which there is open access to the system voltage.

In FIGS. 13 and 14, the length of heat exchanger panel 80 is sufficient such that the turnaround header 88 is located in a space between the tabs 16, 18 of the battery cells 14 which are separated by the heat exchanger panel 80 in which the turnaround header 88 is located. Also as shown in FIG. 14, the turnaround header 88 is expanded in height relative to the height of the inlet and outlet flow passages 98, 100, wherein the height of the turnaround header 88 is substantially the same as the spacing between the tabs 16, 18 of adjacent battery cells 14, such that the top and bottom surfaces 104, 106 of the turnaround header 88 may be in thermal contact with surfaces of the tabs 16, 18. Furthermore, the top and bottom surfaces 104, 106 of the turnaround header 88 may be flattened so as to improve contact with the flat surfaces of tabs 16, 18.

Although the embodiment of FIGS. 13 and 14 has the turnaround header 88 expanded in height and located between the tabs 16, 18 of adjacent battery cells 14, this may not be necessary in all embodiments. For example, FIG. 15 illustrates an end view of an alternate embodiment of a heat exchanger panel 80 in which the inlet and outlet headers 84, 86 are expanded in height and are located between the tabs 16, 18 of adjacent battery cells 14. As with the embodiment of FIGS. 13 and 14, the inlet and outlet headers 84, 86 of the embodiment of FIG. 15 have a height which is substantially the same as the spacing between the tabs 16, 18 of adjacent battery cells 14, such that the top and bottom surfaces of headers 84, 86 may be in thermal contact with surfaces of the tabs 16, 18. Furthermore, the top and bottom surfaces of headers 84, 86 may be flattened so as to improve contact with the flat surfaces of tabs 16, 18. Also, in this embodiment, the inlet and outlet openings 94, 96 may extend widthwise rather than lengthwise so that they extend out from the sides of the heat exchanger panel 80, thereby avoiding interference with the bus bar (not shown) or other electrical components.

It is also possible to adapt the present embodiment to situations where the tabs 16 and 18 are located at opposite ends of the battery cells 14. In such an embodiment, the turnaround header 88 and the inlet and outlet headers 84, 86 may be expanded in height and located between the tabs 16, 18 of adjacent battery cells 14, in the manner illustrated in FIGS. 14 and 15, respectively. Alternatively, the heat exchanger panel 80 may comprise a "single-pass" heat exchanger panel in which the inlet header 84 is located at the first end 90 and the outlet header 86 is located at the second end 92, with both the inlet and outlet headers 84, 86 extending across the entire width of the heat exchanger panel 80. In such an arrangement, the inlet and outlet headers 84, 86 may be expanded in height and located between the tabs 16, 18 of adjacent battery cells 14 in the manner illustrated in FIGS. 14 and 15, respectively.

Although the lengthwise-extending, straight, parallel inlet and outlet passages 98, 100 provide the heat exchanger panel 80 of FIGS. 13 to 15 with low pressure drop, they do not provide for zoned cooling between the first end 90 and the second end 92 of the heat exchanger panel 80. Embodiments of a single-pass and two-pass heat exchanger panel, similar to those described above with reference to FIGS. 13 to 15, which provide for zoned cooling, are now described with reference to FIGS. 16 and 17. The embodiments of FIGS. 16 and 17 share a number of elements with the embodiments shown in FIGS. 13 to 15, and like elements are referred to with like reference numerals.

Figure 16:
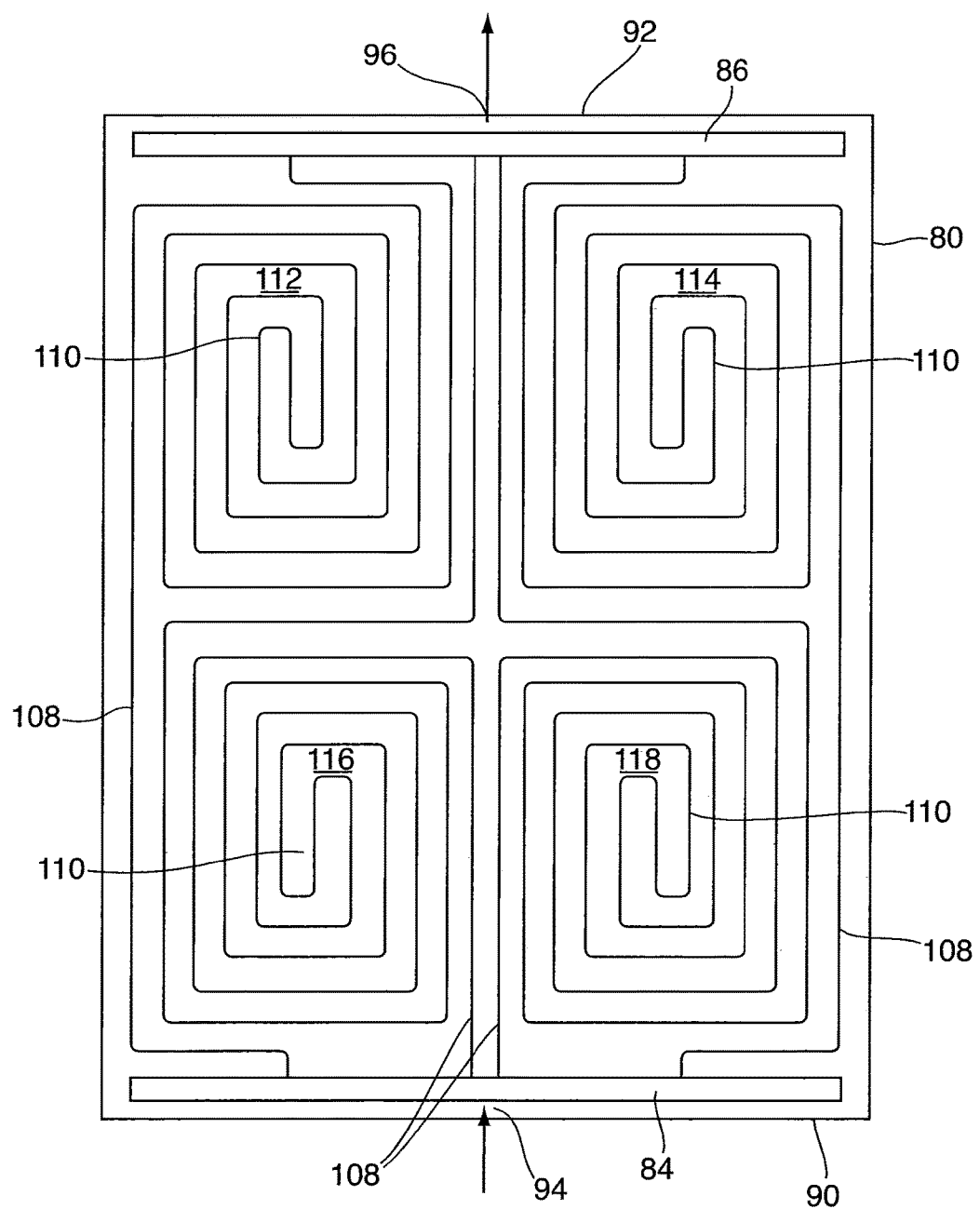
FIG. 16 shows a heat exchanger panel according to another embodiment.

FIG. 16 illustrates a heat exchanger panel 80 having a single-pass configuration, having an inlet header 84 located at the first end 90 of heat exchanger panel 80 and an outlet header 86 located at the opposite, second end 92. The inlet and outlet headers 84, 86 both extend across the entire width of the heat exchanger panel 80, and are provided with respective inlet and outlet openings 94, 96 through which a liquid coolant is received and discharged from the heat exchanger panel 80.

The panel includes a plurality of flow passages 108, each extending from the inlet header 84 to the outlet header 86. Each of the flow passages 108 includes a spiral portion 110 which is provided over a portion of the panel 80 corresponding to a cooling zone. Four such cooling zones 112, 114, 116 and 118 are defined in FIG. 16, each corresponding to the area occupied by one of the spiral portions 110. Although FIG. 16 shows four spiral portions 110 having similar shape and having a specific square spiral shape, it will be appreciated that spiral portions 110 may be of different shapes and sizes. It will also be appreciated that either or both of the inlet and outlet headers 84, 86 may be expanded in height and located in the area between the tabs 16 and/or 18 of a battery cell 14, in the manner of the embodiments of FIGS. 13 to 15, described above.

Figure 17:
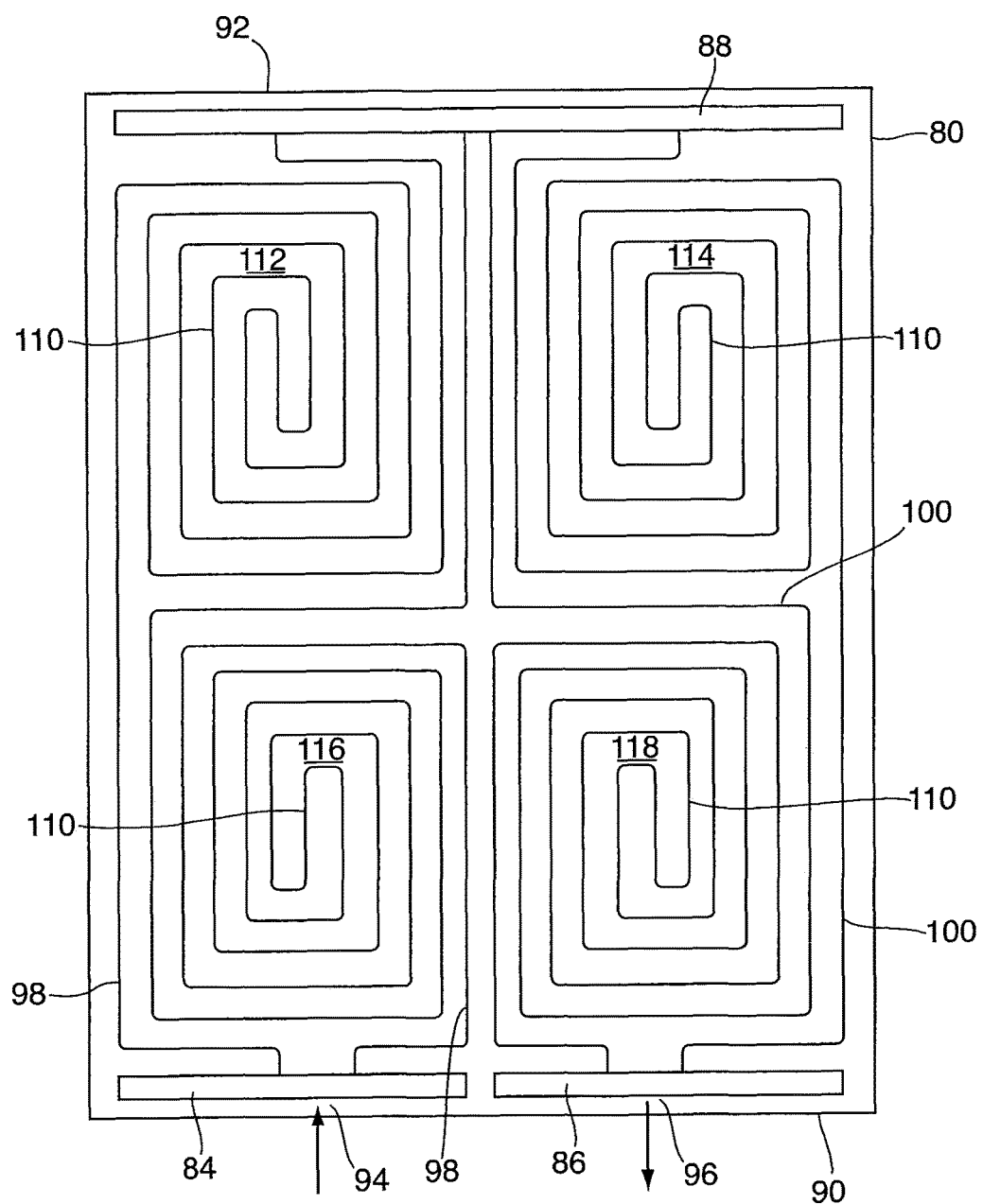
FIG. 17 shows a heat exchanger panel according to another embodiment.

FIG. 17 illustrates a heat exchanger panel 80 having a two-pass configuration, including an inlet header 84 and outlet header 86 arranged at a first end 90 of the heat exchanger panel 80, and a turnaround header 88 at an opposite, second end 92 of the heat exchanger panel 80. The inlet and outlet headers 84, 86 each extend across half the width of the heat exchanger panel 80, and are provided with respective inlet and outlet openings 94, 96 through which a liquid coolant is received and discharged from the heat exchanger panel 80. The turnaround header 88 extends across the entire width of the heat exchanger panel 80. Either the turnaround header 88 or the inlet and outlet headers 84, 86 may be expanded in height and located between the tabs 16, 18 of adjacent battery cells, as shown in FIGS. 13 to 15.

Extending between the first and second ends 90, 92 of the heat exchanger panel 80 are a plurality of inlet flow passages 98 extending from the inlet header 84 to the turnaround header 88, and a plurality of outlet flow passages 100 extending from the turnaround header 88 to the outlet header 86. Each of the inlet and outlet flow passages 98, 100 includes a spiral portion 110 which is provided over a portion of the heat exchanger panel 80 corresponding to a cooling zone. Four such cooling zones 112, 114, 116 and 118 are defined in FIG. 17, each corresponding to the area occupied by one of the spiral portions 110. Although FIG. 16 shows four spiral portions 110 having similar shape and having a specific square spiral shape, it will be appreciated that spiral portions 110 may be of different shapes and sizes.

Figure 18:
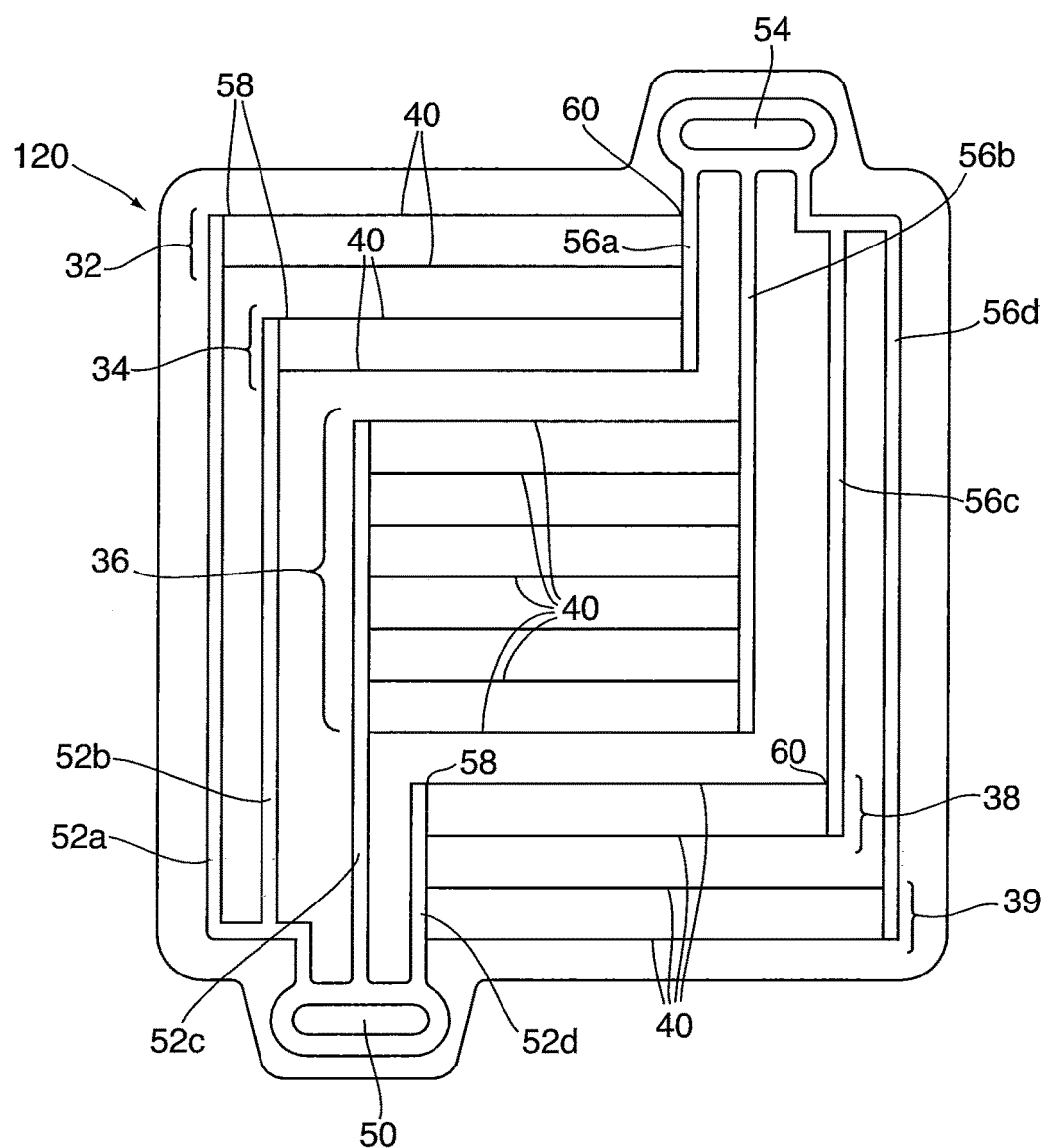
FIGS. 18 to 20 are simplified plan views of various heat exchanger panels having parallel arrangements of fluid flow channels, and having inlet and outlet ports at opposite ends.
Figure 19:
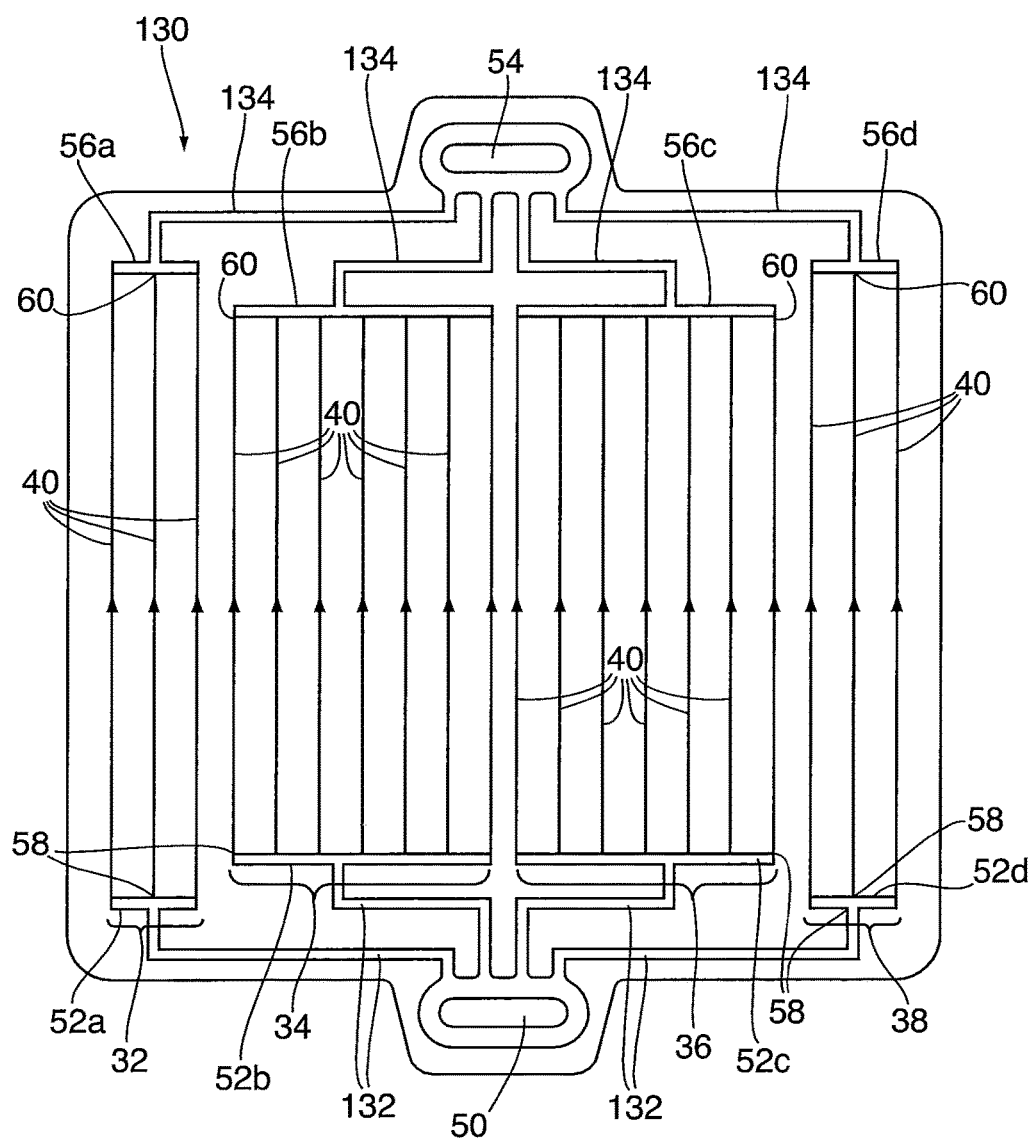
Figure 20:
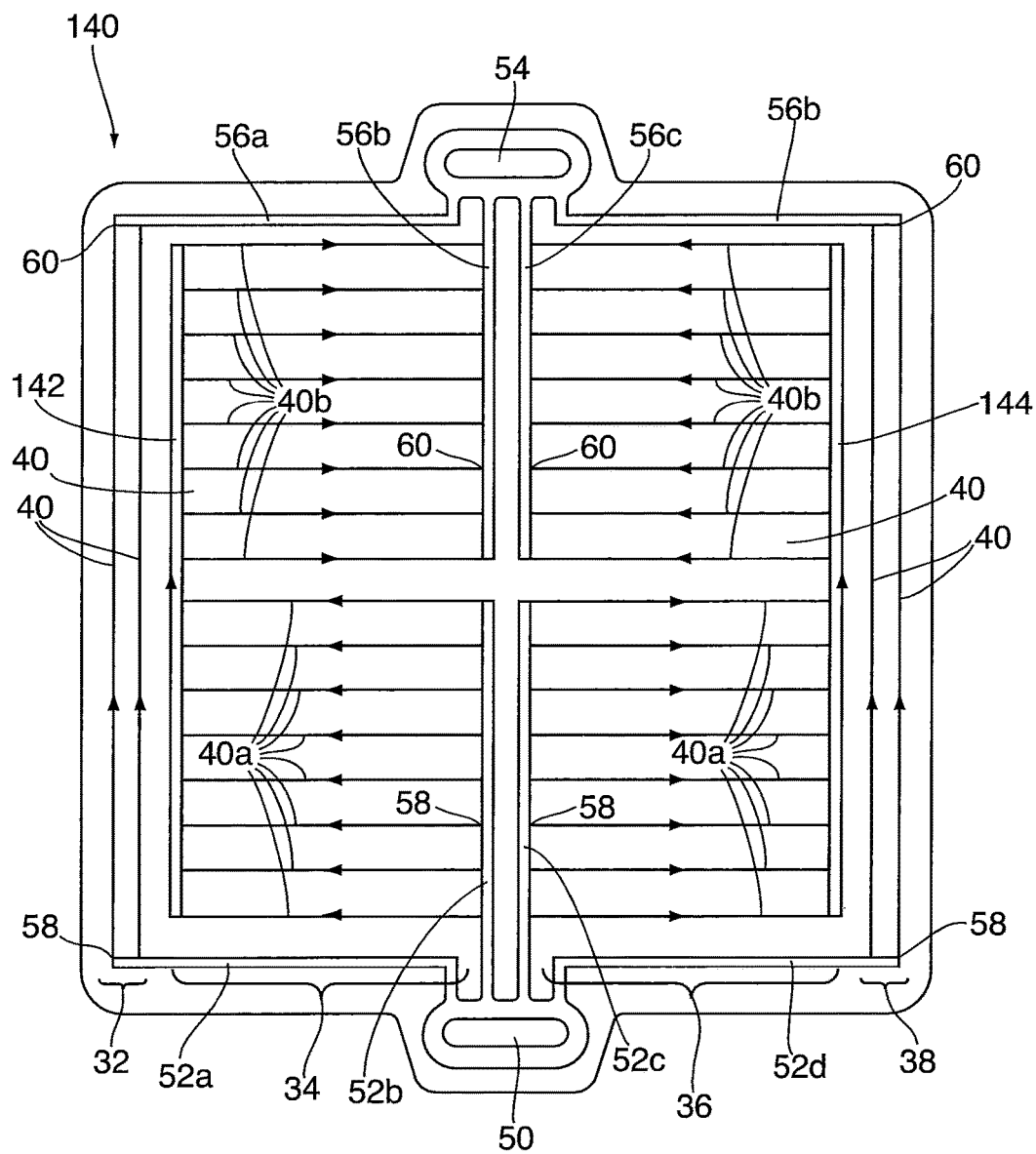

The heat exchanger panels 12 shown in FIGS. 1 to 8 have generally U-shaped flow paths with both the fluid inlet opening 50 and the fluid outlet opening 54 being located at the same end of the heat exchanger panel 12. FIGS. 18-20 illustrate heat exchanger panels according to other embodiments, in which the fluid inlet and outlet openings 50, 54 are located at opposite ends of the heat exchanger panel. The heat exchanger panels of FIGS. 18-20 share a number of common elements with the heat exchanger panels 12 shown in FIGS. 1-8. These common elements are identified below and in the drawings with like reference numerals, and unless indicated otherwise, the above descriptions of these elements with reference to FIGS. 1-8 applies equally to FIGS. 18-20.

FIG. 18 illustrates a heat exchanger panel 120 in which the fluid inlet opening 50 and the fluid outlet opening 54 are located at opposite ends of the heat exchanger panel 120, and at diagonally opposed corners. The heat exchanger panel 120 of FIG. 18 is divided into five heat transfer zones 32, 34, 36, 38 and 39, each of which comprises two or more parallel fluid flow passages 40 communicating with a fluid inlet passage 52 and a fluid outlet passage 56, and being oriented at about 90 degrees to the fluid inlet and outlet passages 52, 56. The direction of fluid flow through all passages 40 is the same, and is parallel to the ends of the heat exchanger panel 120. In this embodiment, the fluid inlet end outlet passages 52, 56 extend parallel to the sides of the heat exchanger panel 120, and the fluid flow passages 40 extend parallel to the ends of the heat exchanger panel 120.

In the embodiment of FIG. 18, the fluid flow passages 40 of the two topmost heat transfer zones 32, 34 have first ends 58 in flow communication with respective fluid inlet passages 52a, 52b, wherein fluid inlet passage 52b is shown in FIG. 18 as being a branch of fluid inlet passage 52a. The second ends 60 of these same fluid flow passages 40 are in flow communication with a common fluid outlet passage 56a.

In the embodiment of FIG. 18, the fluid flow passages 40 of the middle heat transfer zone 36 are each in flow communication with a fluid inlet passage 52c and a fluid outlet passage 56b.

The fluid flow passages 40 of the lowermost heat transfer zones 38, 39 of the embodiment of FIG. 18 have second ends 60 which are in flow communication with respective fluid outlet passages 56c and 56d, wherein fluid outlet passage 56c is a branch of fluid outlet passage 56d. The first ends 58 of these same fluid flow passages 40 are in flow communication with a common fluid inlet passage 52d.

FIG. 19 illustrates a heat exchanger panel 130 in which the fluid inlet opening 50 and the fluid outlet opening 54 are directly opposed to one another and located at opposite ends of the panel 130. Heat exchanger panel 130 is divided into four heat transfer zones 32, 34, 36 and 38, each of which comprises three or more parallel fluid flow passages 40 communicating with a fluid inlet passage 52 and a fluid outlet passage 56, and being oriented at about 90 degrees to the fluid inlet and outlet passages 52, 56. The direction of fluid flow through fluid flow passages 40 is indicated by arrows in FIG. 19, and is the same for all the fluid flow passages 40. In this embodiment, the fluid flow passages 40 extend parallel to the sides of the heat exchanger panel 130, and the fluid inlet end outlet passages 52, 56 extend parallel to the ends of the heat exchanger panel 130. The fluid inlet passages 52 each comprise an elongate header which communicates with the fluid inlet opening 50 through an inlet transition passage 132. Similarly, the fluid outlet passages 56 each comprise an elongate header which communicates with the fluid outlet opening 54 through an outlet transition passage 134.

In the embodiment of FIG. 19, the fluid flow passages 40 of the two outermost heat transfer zones 32, 38 have first ends 58 in flow communication with respective fluid inlet passages 52a, 52d. The second ends 60 of these same fluid flow passages 40 are in flow communication with respective fluid outlet passages 56a, 56d. The fluid flow passages 40 of the two innermost heat transfer zones 34, 36 are in flow communication with respective fluid inlet passages 52b, 52c and with respective fluid outlet passages 56b, 56c.

FIG. 20 illustrates a heat exchanger panel 140 in which the fluid inlet opening 50 and the fluid outlet opening 54 are directly opposed to one another and located at opposite ends of the heat exchanger panel 140. Heat exchanger panel 140 is divided into four heat transfer zones 32, 34, 36 and 38, an outermost pair of heat transfer zones 32, 38, and an innermost pair of heat transfer zones 34, 36. The outermost pair of heat transfer zones 32, 38 each comprise two parallel fluid flow passages 40 communicating with a respective fluid inlet passages 52a, 52d and with a respective fluid outlet passage 56a, 56d, and being oriented at about 90 degrees to the fluid inlet and outlet passages 52a, 52d, 56a, 56d, and parallel to the sides of the panel heat exchanger 140, with the direction of fluid flow through fluid flow passages 40 of heat transfer zones 32, 38 being indicated by arrows in FIG. 20.

The innermost two heat transfer zones 34, 36 include fluid flow passages 40 which are U-shaped, each having a first end 58 in flow communication with a respective fluid inlet passage 52b, 52c, and having a second end 60 in flow communication with a respective fluid outlet passage 56b, 56c. In the embodiment of FIG. 20, the fluid inlet and outlet passages 52b, 52c, 56b, 56c are located centrally in heat exchanger panel 140, with fluid inlet and outlet passages 52b, 56b being substantially co-linear, as are the fluid inlet and outlet passages 52c, 56c.

Each fluid flow passage 40 in each of the innermost two heat transfer zones 34, 36 comprises a first leg 40a and a second leg 40b. In heat transfer zone 34, the first and second legs 40a, 40b communicate with one another through a turnaround header 142. Similarly, in heat transfer zone 36, the first and second legs 40a, 40b communicate with one another through a turnaround header 144. Both legs 40a, 40b of each fluid flow passage 40 are parallel to the ends of the panel 140.

Additional embodiments are now described with reference to FIGS. 21 and 22. The embodiment of FIGS. 13 and 14 similarly has repeating units comprising one heat exchanger panel 80 and one battery cell 14, wherein each panel 80 has a turnaround header 88 with a height which is about the same as the spacing between the tabs 16, 18 of adjacent battery cells 14, such that the tabs 16, 18 of each battery cell 14 are sandwiched between, and in thermal contact with, the turnaround headers 88 of adjacent panels 80. Therefore, in the 1:1 configuration of FIGS. 13 and 14, the tabs 16, 18 are supported on both sides by the turnaround headers 88.

Figure 21:
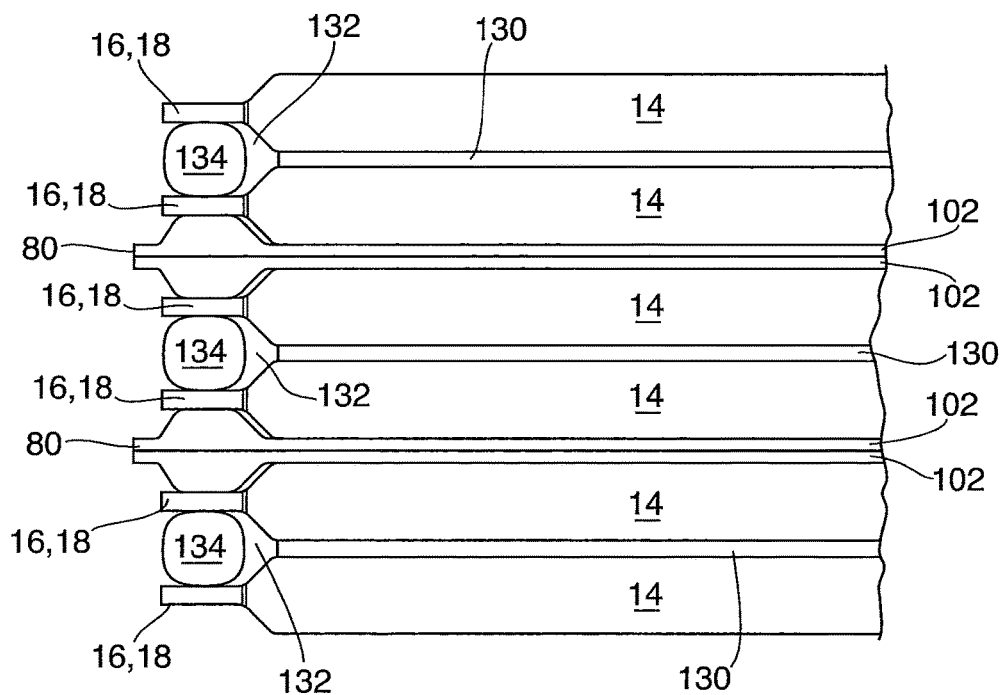
FIGS. 21 and 22 show a heat exchanger according to another embodiment, having panels with enlarged headers for battery tab cooling, and having filler strips to fill gaps between adjacent battery cells.
Figure 22:
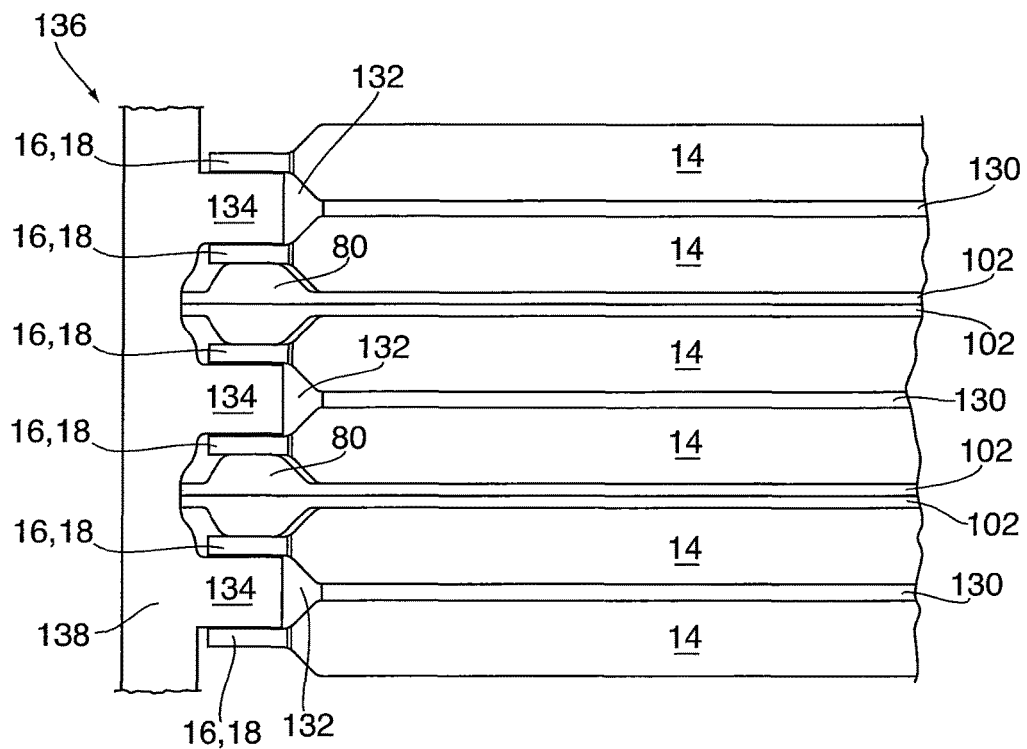

FIGS. 21 and 22 illustrate a portion of a battery module 1 comprising a plurality of battery cells 14 and a plurality of heat exchanger panels 80 similar to those shown in FIGS. 13 and 14. However, the embodiment of FIGS. 21-22 differs from the embodiment of FIGS. 13-14 in that the repeating unit of the battery module 1 in FIGS. 21-22 comprises two battery cells 14 and one heat exchanger panel 80, and is sometimes referred to herein as a "2:1 configuration". In accordance with this 2:1 configuration, one surface of each battery cell 14 is in thermal contact with one heat exchanger panel 80, while the opposite surface faces an adjacent battery cell 14. The two adjacent battery cells 14 of each repeating unit in the 2:1 configuration may be separated from one another by a spacer pad 130. The spacer pad 130 may have substantially the same area as the battery cells 14 and may be comprised of a compliant, deformable material, such as a polymeric foam which deforms with compression of the battery module 1.

As can be seen from FIGS. 21-22, the 2:1 configuration results in the tabs 16, 18 of each battery cell 14 being in contact with the turnaround header 88 of only one adjacent heat exchanger panel 80, and there is a gap 132 between the tabs 16, 18 of the two battery cells 14 in each repeating unit. In order to provide support for the tabs 16, 18, the gap 132 may be filled with an elongate filler strip 134. In the embodiment shown in FIG. 21, the filler strip 134 is a cylindrical rod and may be comprised of a compliant, deformable material, such as a polymeric foam. For example, the filler strip 134 may comprise an open cell polyurethane foam. Although the filler strip 134 shown in FIG. 21 is in the form of a cylindrical rod, it will be appreciated that this is not essential. The filler strip 134 may have any desired cross-sectional shape, including rectangular, square, triangular (i.e. wedge-shaped), or any non-circular rounded shape including oval, egg-shaped, etc. The cross-sectional shape and size of the filler strip 134 are selected such that the strip 134 will fit within the gap 132 and will not interfere with the bus bar or other electrical components in the vicinity of the tabs 16, 18.

In the configuration shown in FIG. 21, filler strips 134 are individually placed in the gaps 132 between each adjacent pair of battery cells 14. In order to improve efficiency of manufacturing, the filler strips 134 may be connected together into a comb-like support structure 136 as shown in FIG. 22, in which the filler strips 134 form the teeth of the comb, and one edge of each filler strip 134 is attached to a connecting portion 138. The connecting portion 138 of support structure 136 is also arranged such that it will not interfere with the bus bar or other electrical components.

Although FIGS. 21-22 show the heat exchanger panels 80 as having substantially the same configuration as in FIGS. 13-14, it will be appreciated that the 2:1 configuration can also employ heat exchanger panels 80 in accordance with the embodiment of FIG. 15, in which the inlet and outlet headers 84, 86 are expanded in height and are located between the tabs 16, 18 of adjacent battery cells 14. In such an embodiment, each tab 16 or 18 will be supported on one side by the inlet or outlet header 84 or 86 of an adjacent heat exchanger panel 80, while the opposite sides of tabs 16, 18 will be supported by a filler strip 134 as described above.

Although the invention has been described in connection with certain embodiments, it is not restricted thereto. Rather, the invention includes all embodiments which may fall within the scope of the following claims.

What is claimed is:

1. A heat exchanger panel having an external heat transfer surface, the surface having a first heat transfer zone and a second heat transfer zone, the heat exchanger panel comprising:
   (a) a first subgroup of fluid flow passages provided in the first heat transfer zone, wherein the first subgroup of fluid flow passages has a first flow capacity;
   (b) a second subgroup of fluid flow passages provided in the second heat transfer zone, wherein the second subgroup of fluid flow passages has a second flow capacity which is less than the first flow capacity;
   (c) at least one fluid inlet passage;
   (d) at least one fluid outlet passage;
   (e) a fluid inlet opening in flow communication with the at least one fluid inlet passage; and
   (f) a fluid outlet opening in flow communication with the at least one fluid outlet passage;
   wherein each of the fluid flow passages has a first end which is connected to, and in flow communication with, one of said at least one fluid inlet passages;
   wherein each of the fluid flow passages has a second end which is connected to, and in flow communication with, one of said at least one fluid outlet passages;
   wherein the at least one fluid inlet passage comprises first and second said fluid inlet passages which are both in flow communication with the fluid inlet opening, and/or the at least one fluid outlet passage comprises first and second said fluid outlet passages which are both in flow communication with the fluid inlet opening;
   wherein:
   (i) where the at least one fluid inlet passage includes said first and second fluid inlet passages:
      the first end of each of the first subgroup of fluid flow passages is in flow communication only with the first fluid inlet passage;
      the first end of each of the second subgroup of fluid flow passages is in flow communication only with the second fluid inlet passage; and
      the first and second fluid inlet passages are separated by an inlet passage rib, wherein the inlet passage rib has a terminal end which is spaced from an edge of the fluid inlet opening, such that a fluid distribution space is provided between the edge of the fluid inlet opening and the terminal end of the inlet passage rib; and/or
   (ii) where the at least one fluid outlet passage includes said first and second fluid outlet passages:
      the second end of each of the first subgroup of fluid flow passages is in flow communication only with the first fluid outlet passage;
      the second end of each of the second subgroup of fluid flow passages is in flow communication only with the second fluid outlet passage; and
      the first and second fluid outlet passages are separated by an outlet passage rib, wherein the outlet passage rib has a terminal end which is spaced from an edge of the fluid outlet opening, such that a fluid distribution space is provided between the edge of the fluid outlet opening and the terminal end of the outlet passage rib.

2. The heat exchanger panel according to claim 1, wherein the first end of each of the fluid flow passages is connected to one of said at least one fluid inlet passages at an angle of about 90 degrees;
   wherein the second end of each of the fluid flow passages is connected to one of said at least one fluid outlet passages at an angle of about 90 degrees;
   wherein each of the first subgroup of fluid flow passages is substantially straight and parallel to each of the other fluid flow passages of the first subgroup;
   wherein each of the second subgroup of fluid flow passages is substantially straight and parallel to each of the other fluid flow passages of the second subgroup; and
   wherein the first subgroup of fluid flow passages is substantially parallel to the second subgroup of fluid flow passages.

3. The heat exchanger panel according to claim 1, wherein the first and second subgroups of fluid flow passages are generally oriented along a first axis of the heat exchanger panel;
   wherein each of the fluid inlet and outlet passages is generally oriented along a second axis of the heat exchanger panel along at least a portion of its length;
   wherein the first axis is substantially perpendicular to the second axis; and
   wherein each of the fluid inlet and outlet passages is substantially parallel to the second axis, at least in areas where it is connected to the ends of the fluid flow passages.

4. The heat exchanger panel according to claim 1, wherein each of the fluid inlet and outlet passages is located proximate to an edge of the panel, at least in areas where it is connected to the ends of the fluid flow passages.

5. The heat exchanger panel according to claim 1, wherein the fluid flow passages of the first and second subgroups are of substantially the same width and height;
   wherein a difference between the first flow capacity and the second flow capacity is at least partly due to the provision of local flow restrictions in at least some of the fluid flow passages of the first subgroup and/or the second subgroup; and
   wherein each of the local flow restrictions comprises a deformation in the shape of one of the fluid flow passages which locally reduces its cross section.

6. The heat exchanger panel according to claim 1, wherein a difference between the first flow capacity and the second flow capacity is at least partly due to the provision of at least some of the fluid flow passages of the first subgroup with a greater width than at least some of the fluid flow passages of the second subgroup.

7. The heat exchanger panel according to claim 1, wherein each of the first subgroup of fluid flow passages has substantially the same fluid-carrying capacity; and/or each of the second subgroup of fluid flow passages has substantially the same fluid-carrying capacity.

8. The heat exchanger panel according to claim 1, wherein a fluid-carrying capacity of the fluid flow passages within the first subgroup and/or the second subgroup is variable, such that a graded cooling capacity is provided in the first heat transfer zone and/or the second heat transfer zone;
   wherein the variability of the fluid-carrying capacities of the fluid flow passages within the first subgroup and/or the second subgroup is at least partly due to the provision of local flow restrictions in at least some of the fluid flow passages of the first subgroup and/or the second subgroup; and
   wherein each of the local flow restrictions comprises a deformation in the shape of one of the fluid flow passages which locally reduces its cross section.

9. The heat exchanger panel according to claim 1, wherein a fluid-carrying capacity of the fluid flow passages within the first subgroup and/or the second subgroup is variable, such that a graded cooling capacity is provided in the first heat transfer zone and/or the second heat transfer zone; and
   wherein the variability of the fluid-carrying capacities of the fluid flow passages is provided at least partly by varying the widths of the fluid flow passages of the first subgroup and/or the second subgroup.

10. The heat exchanger panel according to claim 1, having two of said heat transfer surfaces.

11. The heat exchanger panel according to claim 1, wherein the at least one fluid inlet passage includes said first and second fluid inlet passages separated by a first said inlet passage rib, and wherein the heat exchanger panel further comprises a third said fluid inlet passage separated from the second fluid inlet passage by a second said inlet passage rib;
   wherein the second inlet passage rib has a terminal end which is spaced from the edge of the fluid inlet opening; and
   wherein the terminal end of the first inlet passage rib is spaced from the edge of the fluid inlet opening by a greater distance than the terminal end of the second inlet passage rib.

12. The heat exchanger panel according to claim 1, wherein the at least one fluid outlet passage includes said first and second fluid outlet passages separated by a first said outlet passage rib, and wherein the heat exchanger panel further comprises a third said fluid outlet passage separated from the second fluid outlet passage by a second said outlet passage rib;
   wherein
   the second outlet passage rib has a terminal end which is spaced from the edge of the fluid outlet opening; and
   wherein the terminal end of the first outlet passage rib is spaced from the edge of the fluid outlet opening by a greater distance than the terminal end of the second outlet passage rib.

13. A heat exchanger panel for cooling a battery cell having a pair of tabs, the heat exchanger panel comprising:
   at least one first header located at a first end of the panel, said at least one first header including a fluid inlet header and/or a fluid outlet header;
   a second header located at a second end of the panel;
   a plurality of flow passages extending from the first end to the second end of the panel;
   wherein the at least one first header and/or the second header have a first height which is greater than a second height of the flow passages, and is substantially the same as a spacing between tabs of adjacent batteries when separated by one of said heat exchanger panels.

14. The heat exchanger panel according to claim 13, wherein the at least one first header and/or the second header having said first height has opposed flat surfaces for contacting the tabs of the battery cells.

15. The heat exchanger panel according to claim 13, wherein the at least one first header comprises said fluid inlet header and the second header comprises said fluid outlet header;
   wherein each of the flow passages extends between the fluid inlet header and the fluid outlet header; and
   wherein at least one of the fluid inlet header and the fluid outlet header has said first height greater than the second height of the flow passages, and substantially the same as the spacing between the tabs of adjacent battery cells when separated by one of said heat exchanger panels.

16. The heat exchanger panel according to claim 13, wherein the at least one first header comprises said fluid inlet header and said fluid outlet header;
   wherein the second header comprises a turnaround header;
   wherein said flow passages include a first plurality of inlet flow passages extending from the inlet header to the turnaround header, and a plurality of outlet flow passages extending from the turnaround header to the outlet header; and
   wherein the turnaround header has said first height greater than the second height of the flow passages, and substantially the same as the spacing between the tabs of adjacent battery cells when separated by one of said heat exchanger panels.

17. The heat exchanger panel according to claim 16, wherein both the fluid inlet header and the fluid outlet header have said first height greater than the second height of the flow passages, and substantially the same as the spacing between the tabs of adjacent battery cells when separated by one of said heat exchanger panels.

18. The heat exchanger panel according to claim 13, wherein each of the flow passages includes a spiral portion which is provided over a portion of the panel;
   wherein the panel comprises a plurality of cooling zones, each of the cooling zones having a different cooling capacity; and
   wherein each of said cooling zones is at least partly defined by one of the spiral portions.

19. A heat exchanger comprising a plurality of heat exchanger panels arranged in spaced, parallel relation to one another, wherein each said heat exchanger panel comprises:
   (a) a first external heat transfer surface;
   (b) a plurality of fluid flow passages;
   (c) at least one fluid inlet passage;
   (d) at least one fluid outlet passage;
   (e) a fluid inlet opening in flow communication with the at least one fluid inlet passage; and
   (f) a fluid outlet opening in flow communication with the at least one fluid outlet passage;
   wherein the fluid inlet and outlet openings are in flow communication with respective fluid inlet and outlet manifolds;

wherein each of the fluid flow passages has a first end which is connected to, and in flow communication with, one of said at least one fluid inlet passages; and wherein each of the fluid flow passages has a second end which is connected to, and in flow communication with, one of said at least one fluid outlet passages.

20. The heat exchanger according to claim 19, wherein the first heat transfer surface of each said heat exchanger panel includes a first heat transfer zone and a second heat transfer zone, and wherein said plurality of fluid flow passages comprises:
   (i) a first subgroup of fluid flow passages provided in the first heat transfer zone, wherein the first subgroup of fluid flow passages has a first flow capacity; and
   (ii) a second subgroup of fluid flow passages provided in the second heat transfer zone, wherein the second subgroup of fluid flow passages has a second flow capacity which is less than the first flow capacity.

21. The heat exchanger according to claim 20, wherein a spacing between adjacent heat exchanger panels is sufficient to receive two battery cells;
   wherein each of the battery cells has a pair of tabs and a first thermal region proximate to said tabs and a second thermal region distal to said tabs, and wherein the heat exchanger is adapted to receive the battery cells with the first thermal region of each said battery cell in contact with the first heat transfer zone of one of the heat exchanger panels, and with the second thermal region of each said battery cell in contact with the second heat transfer zone of one of the heat exchanger panels; and
   wherein the first heat transfer zone extends into an area between the tabs of the adjacent panels, and wherein the first heat transfer zone has a thickness sufficient to contact the tabs of the adjacent panels.

22. The heat exchanger according to claim 19, wherein the heat exchanger comprises a plurality of repeating units, each said repeating unit comprising a first battery cell, a second battery cell adjacent to the first battery cell, and one of said heat exchanger panels adjacent to the second battery cell, wherein a gap is provided between the tabs of the first battery cell and the tabs of the second battery cell in each said repeating unit, and wherein the gap is at least partially filled by an elongate filler strip; and
   wherein the elongate filler strip comprises a rod of compliant, deformable material.

23. The heat exchanger according to claim 22, wherein the heat exchanger includes a plurality of said elongate filler strips, including one said filler strip for each said repeating unit, and wherein the elongate filler strips of said repeating units are spaced apart from one another and are attached to a connecting portion.

* * * * *